US009882675B2

(12) United States Patent
Han et al.

(10) Patent No.: US 9,882,675 B2
(45) Date of Patent: Jan. 30, 2018

(54) TIME-REVERSAL WIRELESS SYSTEMS HAVING ASYMMETRIC ARCHITECTURE

(71) Applicant: Origin Wireless, Inc., Boston, MA (US)

(72) Inventors: Feng Han, San Diego, CA (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 45 days.

(21) Appl. No.: 13/969,271

(22) Filed: Aug. 16, 2013

(65) Prior Publication Data

US 2015/0049745 A1 Feb. 19, 2015

(51) Int. Cl.
*H04L 1/00* (2006.01)
*H04L 25/03* (2006.01)

(52) U.S. Cl.
CPC .......... *H04L 1/00* (2013.01); *H04L 25/03343* (2013.01)

(58) Field of Classification Search
CPC . H04B 1/00; H04B 3/32; H04J 3/0638; H04L 1/0002; H04L 1/0054; H04L 1/20; H04L 1/205; H04L 2025/03363; H04L 2025/0349; H04L 2025/03509; H04L 25/03038; H04L 25/085; H04L 25/14; H04L 25/497; H04L 5/0007
See application file for complete search history.

(56) References Cited

U.S. PATENT DOCUMENTS

| 2,933,702 A | 4/1960 | Bogert |
| 3,767,855 A | 10/1973 | Ueno et al. |
| 5,092,336 A | 3/1992 | Fink |
| 5,155,742 A | 10/1992 | Ariyavisitakul et al. |
| 5,428,999 A | 7/1995 | Fink |

(Continued)

FOREIGN PATENT DOCUMENTS

| DK | WO 2007031088 A1 * | 3/2007 | ............... H04L 1/06 |
| EP | 2 571 214 A1 | 11/2012 | |

(Continued)

OTHER PUBLICATIONS

Han, F., Yang, Y.-H., Wang, B., Y. Wu, K.J.R. Liu, "Time-reversal division multiple access over multi-path channels", IEEE Trans. On Communications, vol. 60:1953-1965, Jul. 2012.

(Continued)

*Primary Examiner* — Ayaz Sheikh
*Assistant Examiner* — Debebe Asefa
(74) *Attorney, Agent, or Firm* — Fish & Richardson P.C.

(57) ABSTRACT

In an asymmetric time-reversal wireless system, a base station includes an input circuit configured to, during a hand-shake period, receive a channel response signal derived from a probe signal sent from a first terminal device to the apparatus through multiple wireless propagation paths, and during an uplink transmission period, receive combined signals that include a signal from the first terminal device and a signal from a second terminal device. The base station includes a data processor configured to calculate a signature waveform for the first terminal device based on the channel response, and determine the signal sent from the first terminal device during the uplink transmission period based on the combined signals and the signature waveform for the first terminal device.

36 Claims, 15 Drawing Sheets

(56) References Cited

U.S. PATENT DOCUMENTS

| | | |
|---|---|---|
| 5,926,768 A | 7/1999 | Lewiner et al. |
| 6,301,291 B1 | 10/2001 | Rouphael et al. |
| 6,490,469 B2 | 12/2002 | Candy |
| 6,862,326 B1 | 3/2005 | Eran et al. |
| 7,362,815 B2 | 4/2008 | Lindskog et al. |
| 7,440,766 B1 | 10/2008 | Tuovinen et al. |
| 7,460,605 B2 | 12/2008 | Candy et al. |
| 7,463,690 B2 | 12/2008 | Candy et al. |
| 7,587,291 B1 | 9/2009 | Sarvazyan et al. |
| 7,768,876 B2 | 8/2010 | Dahl et al. |
| 8,195,112 B1 | 6/2012 | Zhang et al. |
| 8,346,197 B2 | 1/2013 | Huy et al. |
| 8,411,765 B2 | 4/2013 | Smith et al. |
| 8,451,181 B2 | 5/2013 | Huy et al. |
| 8,457,217 B2 | 6/2013 | Huy et al. |
| 8,498,658 B2 | 7/2013 | Smith et al. |
| 8,593,998 B2 | 11/2013 | Huy et al. |
| 8,743,976 B2 | 6/2014 | Smith et al. |
| 8,792,396 B2 | 7/2014 | Huy et al. |
| 8,831,164 B2 | 9/2014 | Lu |
| 2001/0037075 A1 | 11/2001 | Candy |
| 2003/0138053 A1 | 7/2003 | Candy et al. |
| 2004/0156443 A1 | 8/2004 | Dent |
| 2006/0098746 A1 | 5/2006 | Candy et al. |
| 2006/0115031 A1 | 6/2006 | Lindskog et al. |
| 2010/0302977 A1 | 12/2010 | Huy et al. |
| 2010/0309829 A1 | 12/2010 | Huy et al. |
| 2012/0155515 A1 | 6/2012 | Smith et al. |
| 2012/0183037 A1 | 7/2012 | Allpress et al. |
| 2012/0207234 A1 | 8/2012 | De Rosny et al. |
| 2012/0257660 A1 | 10/2012 | Smith et al. |
| 2012/0263056 A1 | 10/2012 | Smith et al. |
| 2012/0328037 A1 | 12/2012 | Hsu et al. |
| 2013/0201958 A1 | 8/2013 | Huy et al. |
| 2013/0223503 A1 | 8/2013 | Smith et al. |
| 2014/0022128 A1 | 1/2014 | Smith |
| 2014/0126567 A1 | 5/2014 | Husain et al. |
| 2014/0185596 A1 | 7/2014 | Han et al. |
| 2015/0049745 A1 | 2/2015 | Han et al. |
| 2015/0049792 A1 | 2/2015 | Han et al. |

FOREIGN PATENT DOCUMENTS

| | | | |
|---|---|---|---|
| WO | WO 2007/031088 | 3/2007 | |
| WO | WO 2007031088 A1 * | 3/2007 | |
| WO | WO 2011/029072 | 3/2011 | |
| WO | WO 2011/029075 | 3/2011 | |
| WO | WO 2011029072 A2 * | 3/2011 | ....... H04L 25/03343 |
| WO | WO 2012/151316 | 11/2012 | |
| WO | WO 2013/126054 | 8/2013 | |

OTHER PUBLICATIONS

Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.

Nguyen, H.T., Kovacs, I.Z., Eggers, P.C.F., "A time reversal transmission approach for multiuser UWB communications", IEEE Trans. Antennas and Propagation, vol. 54(11), Nov. 2006.

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

Viteri-Mera, C. A. Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

U.S. Appl. No. 13/706,342, filed Dec. 5, 2012, Yang et al.

Abbasi-Moghadam, D. and V.T. Vakili, "A SIMO one-bit time reversal for UWB communication systems", EURASIP J. Wireless Comm. and Networking, 2012:113, 2012.

Albert, D., L. Liu, M. L. Moran, "Time Reversal processing for source location in an urban environment (L)", J. Acoust. Soc. Am., vol. 118, No. 2, pp. 616-619, Aug. 2005.

Brysev, A.P., L.M. Krutyanskii, V'L. Preobrazhenskii, "Wave Phase Conjugation in ultrasonic beams", Physics-Uspekhi, vol. 41, No. 8, pp. 793-805, 1998.

Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

Chen, Y. et al., "Time-reversal wideband communications," IEEE Signal Processing Letters, vol. 20(12):1219-1222 (Dec. 2013).

Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.

Daniels, R.C. and R. W. Heath, "Improving on time-reversal with MISO precoding," in the Proceedings IWC/WPMC, Aalborg, Denmark, Sep. 2005.

Daniels, R.C. and R. W. Heath, "MISO precoding for temporal and spatial focusing" in the Proceedings of the Eighth International Symposium on Wireless Personal Communications Conference, Aalborg, Denmark, 2005.

de Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.

Derode, A., A. Tourin, and M. Fink, "Ultrasonic pulse compression with one-bit time reversal through multiple scattering", J. Appl. Phys., vol. 85, No. 9, pp. 6343-6352, May 1999.

Derode, A., A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.

Derode, A., P. Roux, and M. Fink, "Robust Acoustic Time Reversal and High-Order Multiple Scattering", Phys. Rev. Lett., vol. 75, No. 23, pp. 4206-4210, Dec. 1995.

Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.

Edelmann, G.F., T. Akal, W.S. Hodgkiss, S. Kim, W.A. Kupeiman and H.C. Song, "An Initial Demonstration of Underwater Acoustic Communication Using Time Reversal", IEEE J. Ocean Eng., vol. 27, No. 3, Jul. 2002.

Emami et al., "Matched Filtering with Rate Back-off for Low Complexity Communications in Very Large Delay Spread Channels," 38th Asilomar Conference on Signals, Systems and Computers, pp. 218-222, 2004.

Emami, S.M., J. Hansen, A.D. Kim, G. Papanicolaou, A.J. Paulraj, D. Cheung, C. Prettie, "Predicted Time Reversal Performance in Wireless Communications using Channel Measurements", publication details unknown.

Fink, M. and C. Prada, "Acoustic Time-Reversal Mirrors", Inverse Problems, vol. 17, pp. R1-R38, 2001.

Fink, M., "Time Reversal of Ultrasonic Fields-Part I: Basic Principals", IEEE Trans. Ultrasonics, Ferroelectrics and Freq. Contr., vol. 39, No. 5, pp. 555-566, Sep. 1992.

Fink, M., "Time-Reversal Mirrors", J. Phys. D: Appl. Phys., vol. 26, pp. 1333-1350, 1993.

Fink, M., "Time-Reversed Acoustics", Scientific American, pp. 91-97, Nov. 1999.

Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.

Fontana, R.J., S.J. Gunderson, "Ultra-Wideband Precision Asset Location System", Proc. of the IEEE Conf. on UWB Sys. And Tech., pp. 147-150, 2002.

(56) References Cited

OTHER PUBLICATIONS

G. Lerosey, J. de Rosny, A. Tourin, A. Derode, M. Fink, "Time Reversal of Wideband Microwaves", Appl. Phys. Lett., vol. 88, 154101, Apr. 2006.

Guo, N., B.M. Sadler and R.C. Qiu, "Reduced-Complexity UWB Time-Reversal Techniques and Experimental Results", IEEE Trans. On Wireless Comm., vol. 6, No. 12, Dec. 2007.

H.T. Nguyen, "Partial one bit time reversal for UWB impulse radio multi-user communications", IEEE Proc. of ICCE, 2008.

Han, F. and K.J.R. Liu, "A multiuser TRDMA uplink system with 2D parallel interference cancellation," IEEE Transactions on Communications, vol. 62(3):1011-1022 (Mar. 2014).

Han, F. and K.J.R. Liu, "An Interference Cancellation Scheme for the Multiuser TRDMA Uplink System," Global Telecommunications Conference, pp. 3583-3588 (2013).

Han, F., "Energy Efficient Optimization in Green Wireless Networks", University of Maryland Ph. D. Dissertation, 2013.

Han, F., Y.H. Yang, B. Wang, Y. Wu, K.J.R. Liu, "Time-reversal division multiple access in multi-path channels," Global Telecommunications Conference, pp. 1-5 (2011).

Han, F., Y.H. Yang, B. Wang, Y. Wu, K.J.R. Liu, "Time-reversal division multiple access over multi-path channels," IEEE Transactions on Communications, vol. 60(7):1953-1965 (Jul. 2012).

Henty, B.E. and D.D. Stancil, "Multipath-Enabled Super-Resolution for RF and Microwave Communication using Phase-Conjugate Arrays", Phys. Rev. Lett., vol. 93, 243904, Dec. 2004.

Jin, JY. and .M.F. Moura, "Time Reversal Detection Using Antenna Arrays", IEEE Trans. On Signal Process., vol. 57, No. 4, Apr. 2009.

Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.

Kuperman, W.A., W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.

Kyritsi, P. and G. Papanicolau, "One-bit Time Reversal for WLAN Applications", IEEE 16$^{th}$ Intern. Symp. On Personal, Indoor and Mobile Radio Comm., pp. 532-536, 2005.

Kyritsi, P. et al., "Time reversal and zero-forcing equalization for fixed wireless access channels," 39th Asilomar Conference on Signals, Systems and Computers, pp. 1297-1301 (2005).

Kyritsi, P. et al., "Time reversal techniques for wireless communications," IEEE Vehicular Technology Conference, vol. 1:47-51 (2004).

Lemoult, F., G. Lerosey, J. de Rosny, and M. Fink, "Manipulating Spatiotemporal Degrees of Freedom in Waves of Random Media", Phys. Rev. Lett., vol. 103, 173902, Oct. 2009.

Lemoult, F., G. Lerosey, J. de Rosny, and M. Fink, "Resonant Metalenses for Breaking the Diffraction Barrier", Phys. Rev. Lett., vol. 104, 203901, May 2010.

Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May 2004.

Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.

Lerosey, G., J. de Rosny, A. Tourin, and M. Fink, "Focusing beyond the diffraction limit with far-field time reversal", Science, vol. 315, pp. 1120-1122, Feb. 2007.

Lienard, M. et al., "Focusing gain model of time-reversed signals in dense multipath channels," IEEE Antennas and Wireless Propagation Letters, vol. 11:1064-1067 ( 2012).

Ma, H., F. Han, and K.J.R. Liu, "Interference-Mitigating Broadband Secondary User Downlink System: A Time-Reversal Solution", Global Telecommunications Conference, pp. 884-889, (2013).

Montaldo, G., G. Lerosey, A. Derode, A. Tourin, J. de Rosny, and M. Fink, "Telecommunication in a disordered environment with iterative time reversal," Waves Random Media, vol. 14, pp. 287-302, May 2004.

Moura, J.M.F. and Y. Jin, "Detection by Time Reversal: Single Antenna", IEEE Trans. On Signal Process., vol. 55, No. 1, Jan. 2007.

Moura, J.M.F. and Y. Jin, "Time Reversal Imaging by Adaptive Interference Canceling", IEEE Trans. On Signal Process., vol. 56, No. 1, Jan. 2008.

Naqvi, I.H., A. Khaleghi and G. El Zein, "Perfoiiiiance Enhancement of Multiuser Time Reversal UWB Communication System", Proc. of IEEE ISWCS, pp. 567-571, 2007.

Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.

Naqvi, I.H., P. Besnier and G. El Zein, "Effects of Time Variant Channel on a Time Reversal UWB System", Global Telecommunications Conference, (2009).

Nguyen, H. T. et al., "A time reversal transmission approach for multiuser UWB communications," IEEE Transactions on Antennas and Propagation, vol. 54: 3216-3224 (Nov. 2006).

Nguyen, H. T., "On the performance of one bit time reversal for multi-user wireless communications", IEEE Proc. of ISWCS, pp. 672-676, 2007.

Nguyen, H., F. Zheng, and T. Kaiser, "Antenna Selection for Time Reversal MIMO UWB Systems", IEEE Vehicle Technology Conference, pp. 1-5, 2009.

Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.

Nguyen, H., Z. Zhao, F. Zheng, and T. Kaiser, "Preequalizer Design for Spatial Multiplexing SIMO-UWB TR Systems", IEEE Trans. On Vehicular Tech., vol. 59, No. 8, Oct. 2010.

Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.

Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

Notification of Transmittal of The International Search Report And The Written Opinion of the International Searching Authority, or the Declaration, for International Appl. No. PCT/US2014/051148, mailed on Jan. 23, 2015, 16 pages.

Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.

Parvulescu, A. and Clay, C. S., "Reproducibility of Signal Transmissions in the Ocean", The Radio and Electronic Engineer, pp. 223-228, Apr. 1965.

Phan-Huy, D. T., S.B. Halima, M. Helard, "Frequency Division Duplex Time Reversal", Global Telecommunications Conference, (2011).

Porcino, D., "Ultra-Wideband Radio Technology: Potential and Challenges Ahead", IEEE Communications Mag., pp. 66-74, Jul. 2003.

Prada, C., F. Wu, and M. Fink, "The iterative time reversal mirror: A solution to self-focusing in the pulse echo mode," J. Acoustic Society of America, vol. 90, pp. 1119-1129, 1991.

Price, R., "A Communication Technique for Multipath Channels", Proceeding of the IRE, vol.

Qiu, R. C. et al., "Time reversal with miso for ultra-wideband communications: Experimental results," IEEE Antenna and Wireless Propagation Letters, vol. 5:269-273 (2006).

Rode, J. P., M.J. Hsu, D. Smith and A. Hussain, "Collaborative Beamfocusing Radio (COBRA)", Proc. of SPIE, vol. 8753, pp. 87530J-1-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

(56) References Cited

OTHER PUBLICATIONS

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.
Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).
Wang, B. et al., "Green wireless communications: A time-reversal paradigm," IEEE Journal of Selected Areas in Communications, vol. 29:1698-1710 (2011).
Wu, F., J.L. Thomas, and M. Fink, "Time Reversal of Ultrasonic Fields-Part II: Experimental Results", IEEE Trans. Ultrasonics, Ferroelectrics and Freq. Contr., vol. 39, No. 5, pp. 567-578, Sep. 1992.
Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Yang, Y. H., "Waveform Design and Network Selection in Wideband Small Cell Networks", University of Maryland Ph. D. Thesis, 2013.
Yang, Y. H., B. Wang and K.J.R. Liu, "Waveform Design for Sum Rate Optimization in Time-Reversal Multiuser Downlink Systems", Global Telecommunications Conference, (2011).
Yang, Yu-Han et al., "Near-optimal waveform design for sum rate optimization in time-reversal multiuser downlink systems," vol. 12(1):346-357 (Jan. 2013).
Yuanwei, Jin et al., "Adaptive time reversal beamfotming in dense multipath communication networks," 2008 42nd Asilomar Conference on Signals, Systems and Computers, pp. 2027-2031 (Oct. 2008).
Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.
Feng Han et al., "Time-Reversal Division Multiple Access in Multi-path Channels", *IEEE Globecom 2011 Proceedings*, 5 pages (2011).
Feng Han et al., "Time-Reversal Division Multiple Access over Multi-Path Channels", *IEEE Transactions on Communications*, vol. 60, No. 7, pp. 1953-1965 (Jul. 2012).
Andreas F. Molisch et al., "IEEE 802.15.4a channel model—final report", *Tech. Rep. Document IEEE 802.15-04-0662-02-004a* (2005).
Hu-Han Yang et al., "Near-Optimal Waveform Design for Sum Rate Optimization in Time-Reversal Multiuser Downlink Systems", *IEEE Transactions on Wireless Communications*, vol. 12, No. 1, pp. 346-359 (Jan. 2013).

\* cited by examiner

TIME-REVERSAL WIRELESS SYSTEMS HAVING ASYMMETRIC ARCHITECTURE

TECHNICAL FIELD

This disclosure generally relates to time-reversal wireless systems having asymmetric architecture.

BACKGROUND

In some time-reversal communication systems, when a transceiver A intends to transmit information to a transceiver B, transceiver B first sends a delta-like pilot pulse that propagates through a scattering and multi-path environment, and the signals are received by transceiver A. Transceiver A transmits time-reversed signals back through the same channel to transceiver B. Based on channel reciprocity, a time-reversal communication system leverages the multi-path channel as a matched filter, i.e., treats the environment as a facilitating matched filter computing machine, and focuses the wave at the receiver in both space and time domains.

SUMMARY

In general, in one aspect, a method for time-reversal wireless communication comprises at a transceiver, receiving a channel response signal derived from a probe signal sent from a first device to the transceiver through multiple wireless propagation paths; calculating a signature waveform for the first device based on the channel response; receiving combined signals that include a signal from the first device and a signal from a second device; and determining the signal from the first device based on the combined signals and the signature waveform for the first device.

Implementations of the method may include one or more of the following features. Determining the signal from the first device comprises performing a convolution operation, or an operation equivalent to the convolution operation, between the combined signals and the signature waveform for the first device.

Determining the signal from the first device can include filtering the combined signals using the signature waveform as a filtering parameter.

The signature waveform for the first device can be a time-reversed waveform of the channel response signal derived from the probe signal sent from the first device.

In some examples, the channel response signal can be represented as h(t) and the signature waveform for the first device can be represented as h*(T−t), t representing time, and T representing a delay spread of the multiple propagation paths. In some examples, the channel response signal can be represented as h[k] and the signature waveform for the first device can be represented as h*[L−k], k being an integer, and L representing a delay spread of the multiple propagation paths.

The method can include transmitting, from the transceiver to the first receiver and a second receiver, a combined downlink signal derived from a combination of a first downlink waveform and a second downlink waveform, the first downlink waveform including data intended for the first device, the second downlink waveform including data intended for the second device.

The method can include generating the first downlink waveform based on the data intended for the first device and the signature waveform for the first device.

Generating the first downlink waveform can include performing a convolution of the data intended for the first device and the signature waveform for the first device.

The combined downlink signal can be configured to enable each of the first device and the second device to receive multipath signals that can be used determine a data signal intended for the device, the first and second devices receiving the downlink signal through different propagation paths and determining different data signals.

The transceiver can be part of a base station.

Receiving combined signals can include receiving combined signals that include signals from three or more devices communicating with the transceiver, each of the devices being associated with a corresponding signature waveform.

In some examples, the first device does not calculate the signature waveform. The first device does not perform any signal processing that uses the signature waveform.

In general, in another aspect, an apparatus for time-reversal wireless communication comprises an input circuit configured to, during a hand-shake period, receive a channel response signal derived from a probe signal sent from a first device to the apparatus through multiple wireless propagation paths, and during an uplink transmission period, receive combined signals that include a signal from the first device and a signal from a second device; and a data processor configured to calculate a signature waveform for the first device based on the channel response, and determine the signal sent from the first device during the uplink transmission period based on the combined signals and the signature waveform for the first device.

Implementations of the apparatus may include one or more of the following features. The apparatus can include a base station that includes the input circuit and the data processor.

The data processor can determine the signal sent from the first device by performing a convolution operation, or an operation equivalent to the convolution operation, between the combined signals and the signature waveform for the first device.

The data processor can determine the signal sent from the first device by filtering the combined signals using the signature waveform as a filtering parameter.

The data processor can determine the signature waveform for the first device by generating a time-reversed waveform of the channel response signal derived from the probe signal sent from the first device.

In some examples, the channel response signal can be represented as h(t) and the signature waveform for the first device can be represented as h*(T−t), t representing time, and T representing a delay spread of the multiple propagation paths. In some examples, the channel response signal can be represented as h[k] and the signature waveform for the first device can be represented as h*[L−k], k being an integer, and L representing a delay spread of the multiple propagation paths.

The data processor can be configured to determine a combined downlink signal derived from a combination of a first downlink waveform and a second downlink waveform, the first downlink waveform including data intended for the first device, the second downlink waveform including data intended for the second device.

The data processor can be configured to determine the first downlink waveform based on the data intended for the first device and the signature waveform for the first device.

The data processor can determine the first downlink waveform by performing a convolution, or an operation equivalent to the convolution, of the data intended for the first device and the signature waveform for the first device.

The combined downlink signal can be configured to enable each of the first device and the second device to receive multipath signals that can be used determine a data signal intended for the device, the first and second devices receiving the downlink signal through different propagation paths and determining different data signals.

The input circuit can be configured to receive combined signals that include signals from three or more devices that communicate with the apparatus, and the data processor is configured to calculate a signature waveform for each of the devices.

In some examples, the first device does not calculate the signature waveform. The first device does not perform any signal processing that uses the signature waveform.

In general, in another aspect, a method of communication between a transceiver and multiple devices using wireless multi-path signals is provided. The method comprises performing a hand-shake process between the transceiver and the devices, in which for each device, the transceiver receives a channel response signal derived from a probe signal sent from the device to the transceiver through multiple propagation paths; calculating a signature waveform for each of the devices based on the channel response derived from the probe signal sent from the device; receiving a combined uplink signal that includes uplink signals from two or more devices; and determining the uplink signal from each one of the devices based on the combined uplink signal and the signature waveform for the device.

Implementations of the method may include one or more of the following features. The transceiver can be part of a base station.

In some examples, the devices do not calculate any signature waveform. The devices do not perform any signal processing that uses the signature waveform.

In general, in another aspect, a method of asymmetric time-reversal communication between a plurality of devices using wireless multi-path signals is provided. The method comprises performing a first hand-shake process between the first and second devices, in which the first device receives a channel response signal derived from a probe signal sent from the second device to the first device through multiple wireless propagation paths; performing a second hand-shake process between the first and third devices, in which the first device receives a channel response signal derived from a probe signal sent from the third device to the first device through multiple wireless propagation paths; at the first device, calculating a signature waveform for the second device based on the channel response derived from the probe signal sent from the second device; at the first device, calculating a signature waveform for the third device based on the channel response derived from the probe signal sent from the third device; at the first device, receiving a combined uplink signal that includes uplink signals from the second and third devices; at the first device, determining the uplink signal from the second device based on the combined uplink signal and the signature waveform for the second device; and at the first device, determining the uplink signal from the third device based on the combined uplink signal and the signature waveform for the third device.

Implementations of the method may include one or more of the following features. The second and third devices do not calculate any signature waveform.

The method can include transmitting, from the first device to the second and third devices, a combined downlink signal derived from a combination of a second downlink waveform and a third downlink waveform, the second downlink waveform including data intended for the second device, the third downlink waveform including data intended for the third device.

The second downlink waveform can be embedded with the signature waveform corresponding to the second device.

The method can include at the second device, receiving a signal intended for the second device without performing any signal processing that uses the signature waveform corresponding to the second device.

The method can include at the first device, generating the second downlink waveform based on the data intended for the second device and the signature waveform for the second device.

Generating the second downlink waveform can include performing a convolution of the data intended for the second device and the signature waveform for the second device.

The combined downlink signal can be configured to enable each of the second and third devices to receive multipath signals that can be used determine a data signal intended for the device, the second and third devices receiving the combined downlink signal through different propagation paths and determining different data signals.

Determining the uplink signal from the second device can include performing a convolution operation, or an operation equivalent to the convolution operation, between the combined uplink signal and the signature waveform for the second device.

Determining the uplink signal from the second device can include filtering the combined uplink signal using the signature waveform corresponding to the second device as a filtering parameter.

The signature waveform for the second device can be a time-reversed waveform of the channel response signal derived from the probe signal sent from the second device.

In some examples, the channel response signal derived from the probe signal sent from the second device can be represented as $h(t)$ and the signature waveform for the second device can be represented as $h^*(T-t)$, t representing time, and T representing a delay spread of the multiple propagation paths. In some examples, the channel response signal derived from the probe signal sent from the second device can be represented as $h[k]$ and the signature waveform for the second device can be represented as $h^*[L-k]$, k being an integer, and L representing a delay spread of the multiple propagation paths.

The first device can include a base station.

Receiving a combined uplink signal can include receiving a combined uplink signal that includes signals from the second and third devices, and one or more additional devices communicating wirelessly with the first device, each of the devices being associated with a corresponding signature waveform.

The details of one or more implementations of an asymmetric time-reversal wireless system are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

This disclosure describes a novel asymmetric multi-user time reversal wireless communication system architecture for both downlink and uplink communication between a base station (BS) and multiple terminal devices. The complexities of the base station and the terminal devices are asymmetric, such that the base station performs most of the signal processing as both a transmitter (for the downlink) and receiver (for the uplink), allowing the use of low complexity terminal devices.

For example, an intelligent house may include one or more computers that communicate with several sensors (e.g., temperature, humidity, light, and motion sensors), meters (e.g., electricity and water meters), appliances (e.g., refrigerator, oven, washing machine), electronic devices (e.g., television, digital video recorder, audio/video system, telephone, digital photo album, intelligent lamp, security system), climate control systems (e.g., fans, thermostats for air conditioning and heating, motorized shades), power generators (e.g., backyard wind turbine, solar panel, geothermal energy system). To reduce the cost of communication, it is preferable that the devices communicating with the computer be simple without the need to perform complex signal processing. The computer may function as a base station or be coupled to a base station that performs most of the signal processing when transmitting signals to the devices and receiving signals sent from the devices.

Overview of Time-Reversal System

Figure 1:
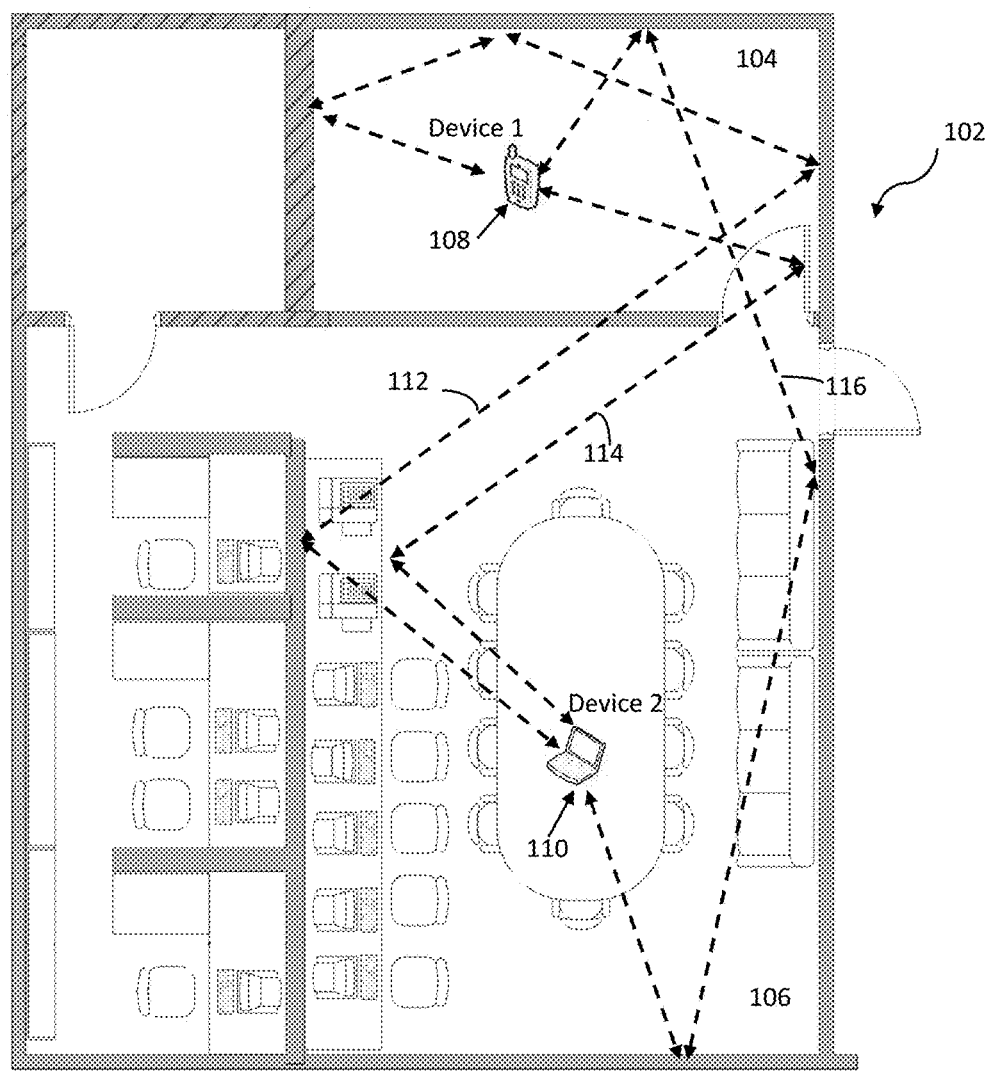
FIG. 1 is a diagram showing an exemplary environment for operating a time-reversal system.

The following provides an overview of a time-reversal multiuser downlink system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. As the signal travel through the propagation paths, the signal may become distorted and noise may be added. The multipath signal received by the second device 110 can be quite different from the signal transmitted by the first device 108.

Figure 2A:
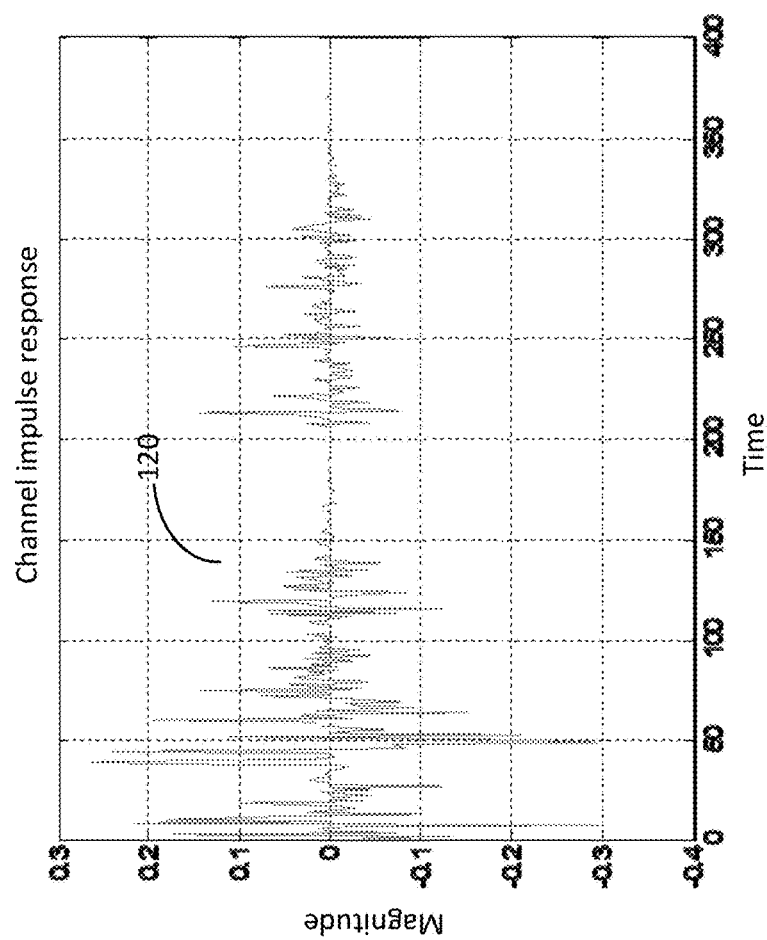
FIG. 2A is a graph of an exemplary recorded channel response waveform.

For example, referring to FIG. 2A, when the first device 108 sends a pulse signal, the signal received by the second device 110 may have a waveform 120. The waveform 120 is referred to as the channel impulse response signal.

Figure 2B:
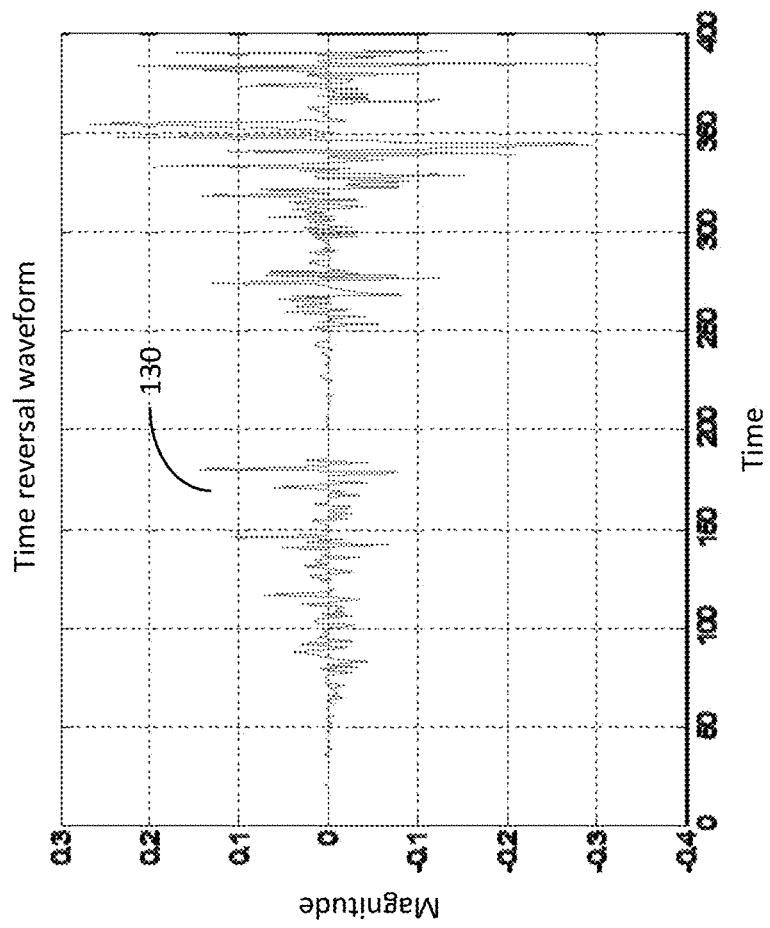
FIG. 2B is a graph of an exemplary time-reversed waveform generated by reversing the waveform of FIG. 2A with respect to time.

Referring to FIG. 2B, a time-reversed waveform 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 forms an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted.

When the second device 110 intends to transmit a data stream to the first device 108, the second device 110 uses normalized time-reversed conjugate signals as a basic waveform. The second device 110 loads the data stream on the basic waveform, and transmits the signal through the wireless channel. Usually the sampling rate is higher than the baud rate. The signal received at the receiver is the convolution of the transmitted signal and the channel impulse response, plus additive white Gaussian noise. The first device 108 performs a simple adjustment to the received signal and down-samples it to recover the data stream transmitted by the second device 110.

In some examples a transmitter may send signals to two or more receivers at the same time. The transmitted signal travel through multiple propagation paths to each receiver. Because the receivers are positioned at different locations, the multipath signals travel through different propagation paths to reach the receivers, different multipath signals will be received at different receivers. By carefully constructing the waveform of the signal sent from the transmitter, it is possible to allow each receiver to receive data intended for the receiver with sufficiently high quality.

Figure 3:
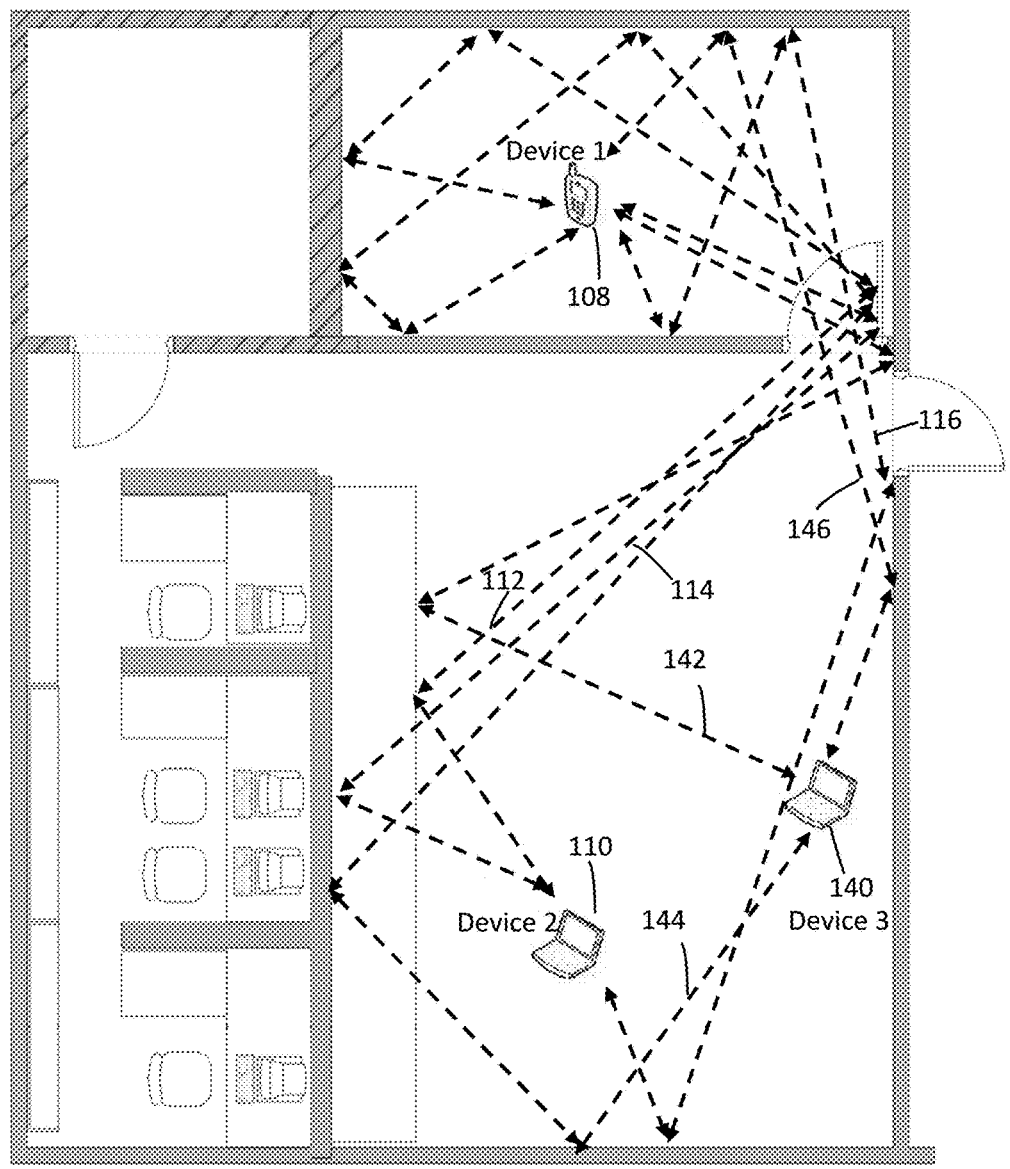
FIG. 3 is a diagram showing an exemplary environment for operating a time-reversal system having multiple receivers.

Referring to FIG. 3, the first device 108 may communicate with the second device 110 and a third device 140. The second device 110 sends a probe signal that travel through propagation paths 112, 114, and 116 to the first device 108. The probe signal can be, e.g., a pulse signal, a signal that has a predetermined waveform, or a signal that includes symbols. The first device 108 records the received waveform representing the channel response for the first multipath channel. The third device 110 sends a probe signal that travels through propagation paths 142, 144, and 146 to the first device 108. The first device 108 records the received waveform representing the channel response for the second multipath channel.

The first device 108 constructs a downlink signal based on a first time-reversed multipath channel response, a second time-reversed multipath channel response, a first data stream intended for the second receiver 110, and a second data stream intended for the third receiver 140. The first device 108 transmits the downlink signal so that a first portion of the downlink signal travels through propagation paths 112, 114, and 116 to reach the second device 110. A second portion of the downlink signal travel through propagation paths 142, 144, and 146 to reach the third device 140. The first signal portion received at the second device 110 forms the first data stream. The second signal portion received at the third device 140 forms the second data stream.

In the example of FIG. 3, the device operating as a transmitter may use either an omnidirectional antenna or a directional antenna for broadcasting the downlink signal, as long as the downlink signal reaches each of the receivers through multiple propagation paths.

In some examples, a multiple input multiple output (MIMO) system may be used in which the device operating as a transmitter has multiple transmit antennas, and each of the devices operating as a receiver has multiple receive antennas.

System Architecture

Figure 4:
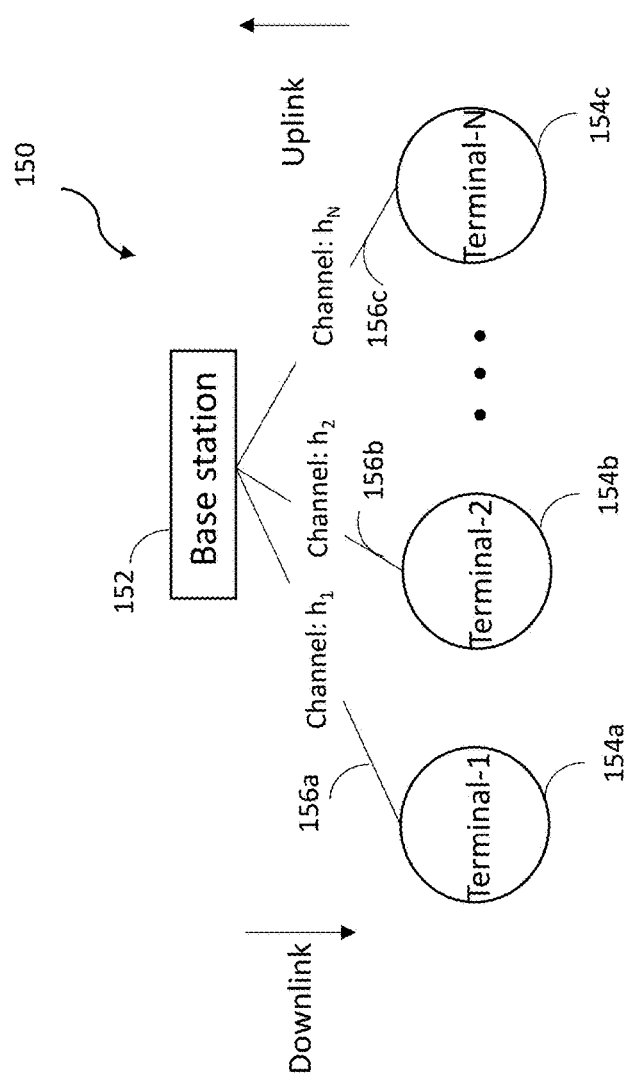
FIG. 4 is a diagram of an exemplary multi-user time reversal communication system.

Referring to FIG. 4, an exemplary multi-user time reversal communication system 150 includes a base station (BS) 152 and multiple terminal devices (e.g., 154a, 154b, 154c, collectively 154). Each of the terminal devices 154 is associated with a multi-path wireless channel (e.g., 156a, 156b, 156c, collectively 156) between itself and the base station 152. Each multi-path wireless channel 156 in the figure represents two or more multiple signal propagation paths between the corresponding terminal and the base station. In some implementations, all the devices (including the base station 152 and the terminals 154) can operate at the same frequency band, and the system operates in multi-path environments. For the downlink, the base station 152 can send multiple messages (either independent or non-independent) simultaneously to multiple selected terminals 154. For the uplink, multiple terminals 154 can send their own messages to the base station 152 simultaneously.

Hand-Shake Process

The following describes a hand-shaking process between the base station 152 and the terminals 154.

Figure 5:
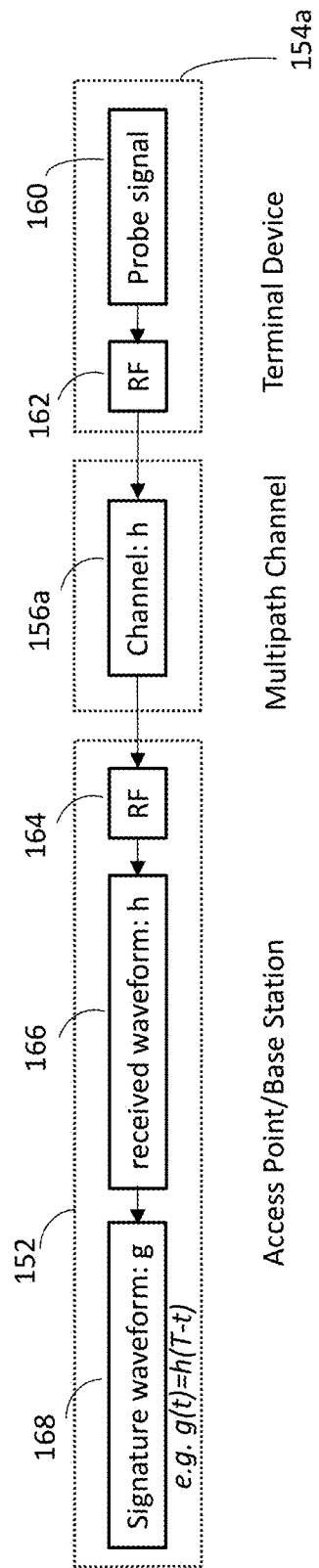
FIG. 5 is a diagram showing a hand-shaking process.

Referring to FIG. 5, in some implementations, after each terminal device 154 registers with the base station 152, a hand-shaking process occurs periodically in a round-robin manner among the registered terminal devices 154 to maintain an up-to-date record of the channel responses associated with the terminal devices 154 at the base station 152.

During the hand-shaking process, at a given time, only one selected terminal, e.g., 154a, sends a probe signal 160, performs radio frequency modulation 162 to produce a radio frequency signal that propagates through the associated multi-path channel 156a to the base station 152. The probe signal 160 can be, e.g., a pulse signal, a signal that has a predetermined waveform, or a signal that includes symbols to enable the base station to perform synchronization and/or other functions. In the examples below, the probe signal is a pulse signal. However, other types of probe signals can be used in the system 150. The base station 152 receives the transmitted radio frequency signal, performs radio frequency demodulation 164 to recover the unique channel response (waveform) 166 and records it. When the selected terminal, e.g., 154a, is performing the hand-shaking process with the base station 152, the other terminals, e.g., 154b and 154c, remain silent. Upon receiving the channel response 166 associated with the terminal 154a, the base station 152 calculates a signature waveform g 168 for the terminal 154a based on its channel response received at the base station 152.

For example, one of the basic signature waveform for a terminal associated with a channel response h(t) can be h*(T−t), which is a time-reversed waveform of the channel response, with T representing the delay spread of the multi-path channel. If h(t) is a complex value, h*(T−t) is the time reverse and conjugation of the channel response h(t). In discrete time domain, the channel response can be represented as h[k], and the corresponding signature waveform can be h*[L−k], in which L represents the delay spread of the multi-path channel.

The delay spread is a measure of the multipath richness of a communications channel. In general, it can be interpreted as the difference between the time of arrival of the earliest significant multipath component (typically the line-of-sight component) and the time of arrival of the latest multipath component. For the discrete time model, by the definition of delay spread, when the delay spread is L, the total channel length is L+1.

The system 150 can use any type of waveform design that is optimized for a variety of performance metrics, such as optimized for minimum inter-symbol interference and minimum inter-user interference.

After the hand-shaking process, the calculated signature waveforms can be used for data transmissions during both the downlink and the uplink processes.

Downlink Transmission

The following describes the downlink transmission process.

Figure 6:
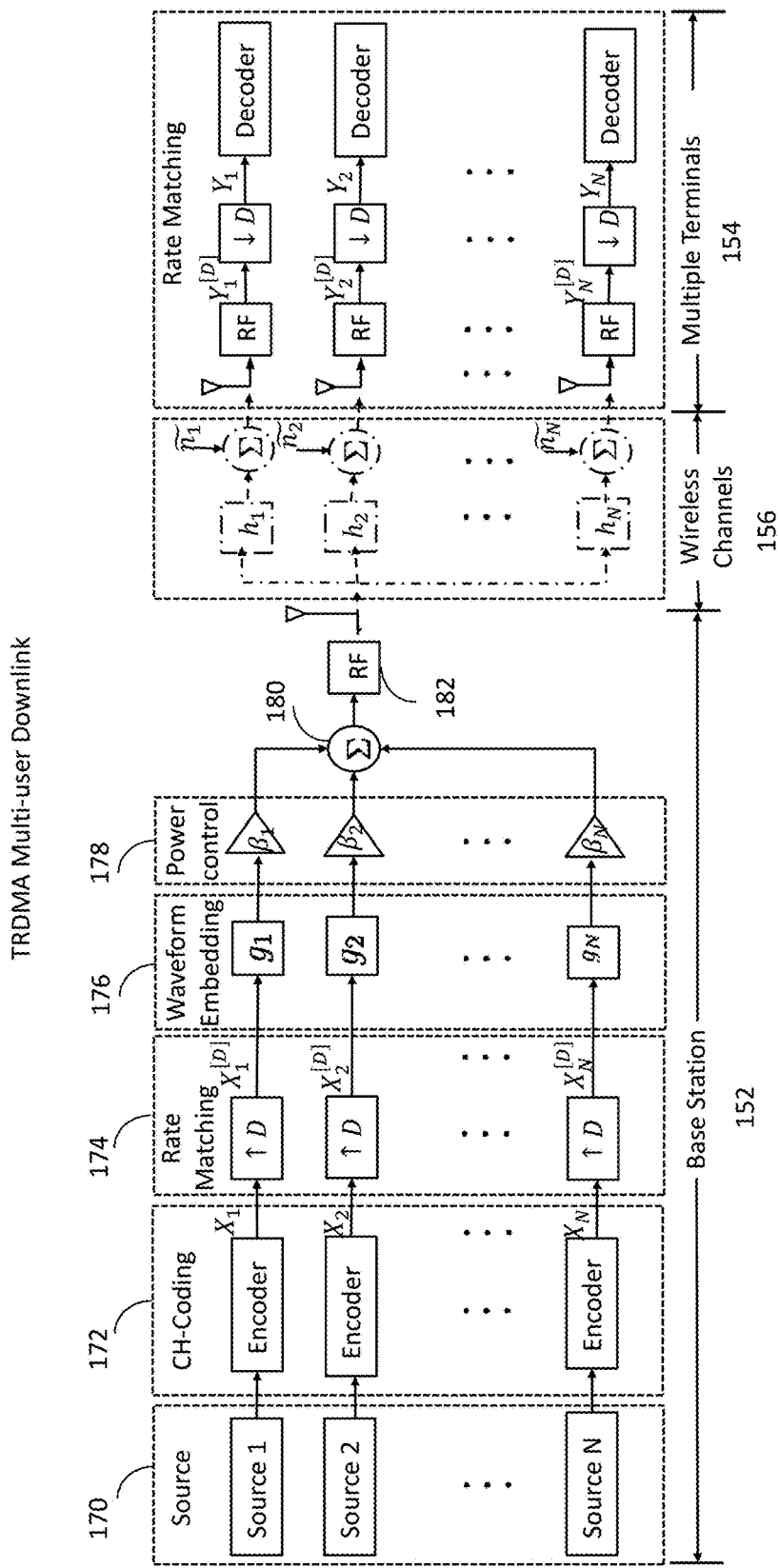
FIG. 6 is a diagram showing a down-link transmission process.

Referring to FIG. 6, assume that there are N active terminal devices 154 receiving data from the base station 152 concurrently. In some implementations, at the base station 152, there are N independent information sources 170, each generating information bits to a corresponding terminal device 154. The information bits from the sources are first encoded by channel-coding using encoders 172. The channel-coding process is optional and may be omitted in some implementations. The encoded bit-scream for any given terminal i∈{1, 2, . . . N} is represented by a sequence of symbols $\{X_i[k]\}$.

A parameter referred to as the rate back-off factor D is used to match the symbol rate (signal bandwidth) with the higher system's sampling rate (channel bandwidth). For any terminal's symbol sequence $\{X_i[k]\}$, $\forall i \in \{1, 2, \ldots N\}$, the rate matching process at the base station 152 is performed by up-sampling the sequence of symbols by the factor D. The rate matching processes may be performed at rate matching modules 176. The up-sampled sequence of $\{X_i[k]\}$, $\forall i \in \{1, 2, \ldots N\}$ can be expressed as $$X_i^{[D]} = \begin{cases} X_i[k/D], & \text{if } k \bmod D = 0, \\ 0, & \text{if } k \bmod D \neq 0. \end{cases}$$

As waveform embedding modules 176, the up-sampled sequences are embedded with the calculated (based on the channel responses obtained in the hand-shaking process) signature waveform $g_i$, $\forall i \in \{1, 2, \ldots N\}$ by taking the convolution of the up-sampled symbol sequence and the corresponding signature waveform. As described above, one of the basic signature waveforms is the time-reversed (and conjugated if the channel response is of complex values) channel response, i.e., $$g_i[k] = \frac{1}{\sqrt{\sum_{l=0}^{L} |h_i[l]|^2}} h_i^*[L-k].$$

The output of the signature embedding block 176 for the i-th terminal is the convolution of $\{X_i^{[D]}[k]\}$ and $\{g_i[k]\}$, i.e.

$$(X_i^{[D]} * g_i)[k] = \sum_{l=0}^{L} g_i[l] X_i^{[D]}[k-l],$$

where (*) is the linear convolution.

After the signature embedding, each of the streams is multiplied by a scalar power gain β to implement the power control mechanism at the power control module 178. All the streams (embedded with signature waveforms) are multiplexed together by a summation module 180 to obtain a combined signal S[k]:

$$S[k] = \sum_{i=0}^{N} \beta_i (X_i^{[D]} * g_i)[k].$$

The combined signal S[k] is transmitted through radio frequency by the RF module 182 and propagates through different multi-path channels $\{h_i[k]\}$ 156, for all i∈{1, 2, . . . N}.

The signal received at the i-th terminal 154 is the multi-path channel output plus additive noise $\tilde{n}_i$.

$$Y_i^{[D]}[k] = (S * h_i)[k] + \tilde{n}_i[k] = \sum_{j=1}^{N} \beta_j (X_j^{[d]} * g_j * h_i)[k] + \tilde{n}_i[k].$$

Due to the temporal focusing effect, the signal energy is concentrated in a single time sample. The i-th terminal 154 does not need to apply complicated equalization to the received signal to recover the signal. The i-th terminal 154 down-samples the received signal with the same factor D (to recover the signal's rate from the system's sampling rate to the symbol rate), producing $Y_i[k]$, represented as follows:

$$Y_i[k] = \sum_{j=1}^{N} \sum_{l=-\lfloor L/D \rfloor}^{\lfloor L/D \rfloor} \beta_j (g_j * h_i)[L+Dl] X_j[k-l] + n_i[k],$$

where $Y_i[k]$ is used to estimate $X_i[k]$, and $n_i[k]=\tilde{n}_i[Dk]$.

Upon obtaining $Y_i[k]$ at the i-th terminal (∀i∈{1, 2, . . . N}) 154, an estimation $\hat{X}_i[k]$ about $X_i[k]$ is made based on the value of $Y_i[k]$. Then, the estimated/reconstructed symbol sequence $\{\hat{X}_i[k]\}$ is fed into the decoder (which corresponds to the encoder) to recover the information bits at each individual terminal device.

Uplink Transmission

The following describes the uplink transmission process.

Figure 7:
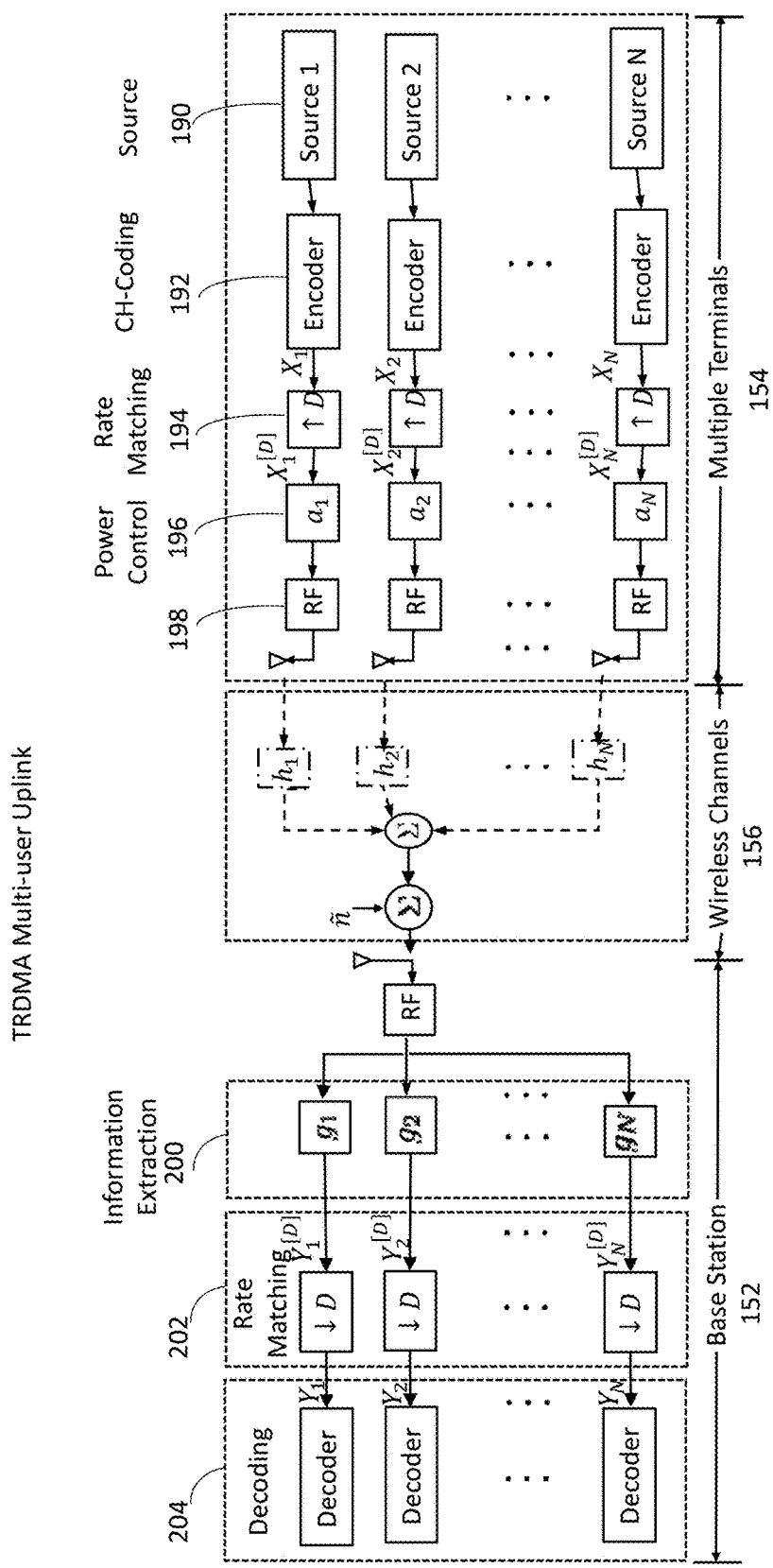
FIG. 7 is a diagram showing an up-link transmission process.

Referring to FIG. 7, for the uplink, assume that there are N active terminal devices 154 transmitting their own data to the base station 152 concurrently. Each terminal device 154 has its own information source 190 which is independent of others.

At each terminal device 154, the information bits are first encoded by the channel coding block 192. Then, the coded symbols $\{X_i[k]\}$ (∀i∈{1, 2, . . . N}) are up-sampled by the rate back-off factor D for rate matching at the rate matching module 194.

The up-sampled symbol sequence for the i-th terminal can be expressed as $$X_i^{[D]} = \begin{cases} X_i[k/D], & \text{if } k \bmod D = 0, \\ 0, & \text{if } k \bmod D \neq 0. \end{cases}$$

The scaling factors $\{a_i\}$ are used to implement the power control at the power control module 196. After multiplying with scaling factor, the sequence of $a_i\{X_i^{[D]}[k]\}$, for all i∈{1, 2, . . . N}, is transmitted by the RF module 198.

When the sequence $a_i\{X_i[D][k]\}$ propagates through its wireless channel $\{h_i[k]\}$ 156, the convolution between $a_i\{X_i^{[D]}[k]\}$ and the channel impulse response $\{h_i[k]\}$ is automatically taken as the channel output for the i-th terminal. Since each terminal's multi-path channel response is unique, the automatic convolution between the $a_i\{X_i^{[D]}[k]\}$ and $\{h_i[k]\}$ is mathematically equivalent to the base station's signature embedding process in the downlink.

All of the channel outputs for the N terminal devices 154 are mixed together in the air plus the additive noise at the base station 152. As a result, the mixed signal received at the base station 152 can be written as $$Z[k] = \sum_{i=0}^{N} a_i (X_i^{[D]} * g_i)[k] + \tilde{n}[k].$$

Upon receiving the mixed signal as shown above, the base station 152 passes this mixed signal through an information extraction module that includes a filter bank 200 of the calculated signature waveforms $g_i$, ∀i∈{1, 2, . . . N}, each of which performs the convolution between its input signal Z[k] and the corresponding terminal device's signature waveform $\{g_i[k]\}$. Such a convolution using the signature waveform extracts the useful signal component and suppresses the signals of other terminal devices. As the output of the i-th filter, the convolution can be represented as $$Y_i^{[D]}[k] = \sum_{j=1}^{N} a_j (X_j^{[D]} * h_j * g_i)[k] + (g_i * \tilde{n})[k] =$$

$$\sum_{j=1}^{N} \sum_{l=0}^{2L} a_j (h_j * g_i)[l] X_j^{[D]}[k-l] + (g_i * \tilde{n})[k].$$

If the time reversal waveform is used for $\{g_i[k]\}$, in the above equation, the highest gain for the i-th terminal's symbol is achieved at the temporal focusing time l=L, with $$(h_i * g_i)[L] = \sqrt{\sum_{l=0}^{L} |h_i[l]|^2}.$$

The rate matching is performed by down-sampling (with the same factor D) the filter bank's output signal at the rate matching module 202 to recover the original symbol rate of each terminal 154.

After the rate matching, the down-sampled symbol sequence $\{Y_i[k]\}$ can be obtained as $$Y_i[k] = \sum_{j=1}^{N} \sum_{l=-\lfloor L/D \rfloor}^{\lfloor L/D \rfloor} a_j(g_i * h_j)[L + Dl]X_j[k-l] + n_i[k]$$

where the colored noise $n_i[k] = \sum_{l=0}^{L} g_i[l]\tilde{n}_i[Dk-l]$.

Based on $Y_i[k]$ ($\forall i \in \{1, 2, \ldots N\}$), an estimation $\hat{X}_i[k]$ about $X_i[k]$ is made. Then, the estimated/reconstructed symbol sequence $\{\hat{X}_i[k]\}$ is fed into the corresponding decoder 204 to recover the information bits from each terminal device at the base station 152.

Simulation Results

The following describes results of simulation of the system 150 under various conditions.

In the simulation, the IEEE 802.15.4a (broadband) channel model was used to evaluate the effectiveness of the proposed system. In the examples shown here, the typical delay spread of the outdoor channels are between 200 ns and 400 ns, and the typical delay spread of the indoor channels are between 70 ns and 120 ns. Without loss of generality, the following system parameters were used to in the simulation:

| IEEE 802.15.4a Outdoor Channel Model | |
| --- | --- |
| System sampling rate | 1 GHz |
| Rate back-off factor: D | 32, 64 |
| $E_b/N_0$ (energy per bit to noise power spectral density ratio) | 0 dB~20 dB |
| Number of concurrent terminals: N | 2, 4 |
| Coding Scheme | None (Uncoded) |
| Power Control Scheme | Equal-Power Allocation |

| IEEE 802.15.4a Indoor Channel Model | |
| --- | --- |
| System sampling rate | 1 GHz |
| Rate back-off factor: D | 16, 32 |
| $E_b/N_0$ | 0 dB~20 dB |
| Number of concurrent terminals: N | 2, 4 |
| Coding Scheme | None (Uncoded) |
| Power Control Scheme | Equal-Power Allocation |

Figure 8:
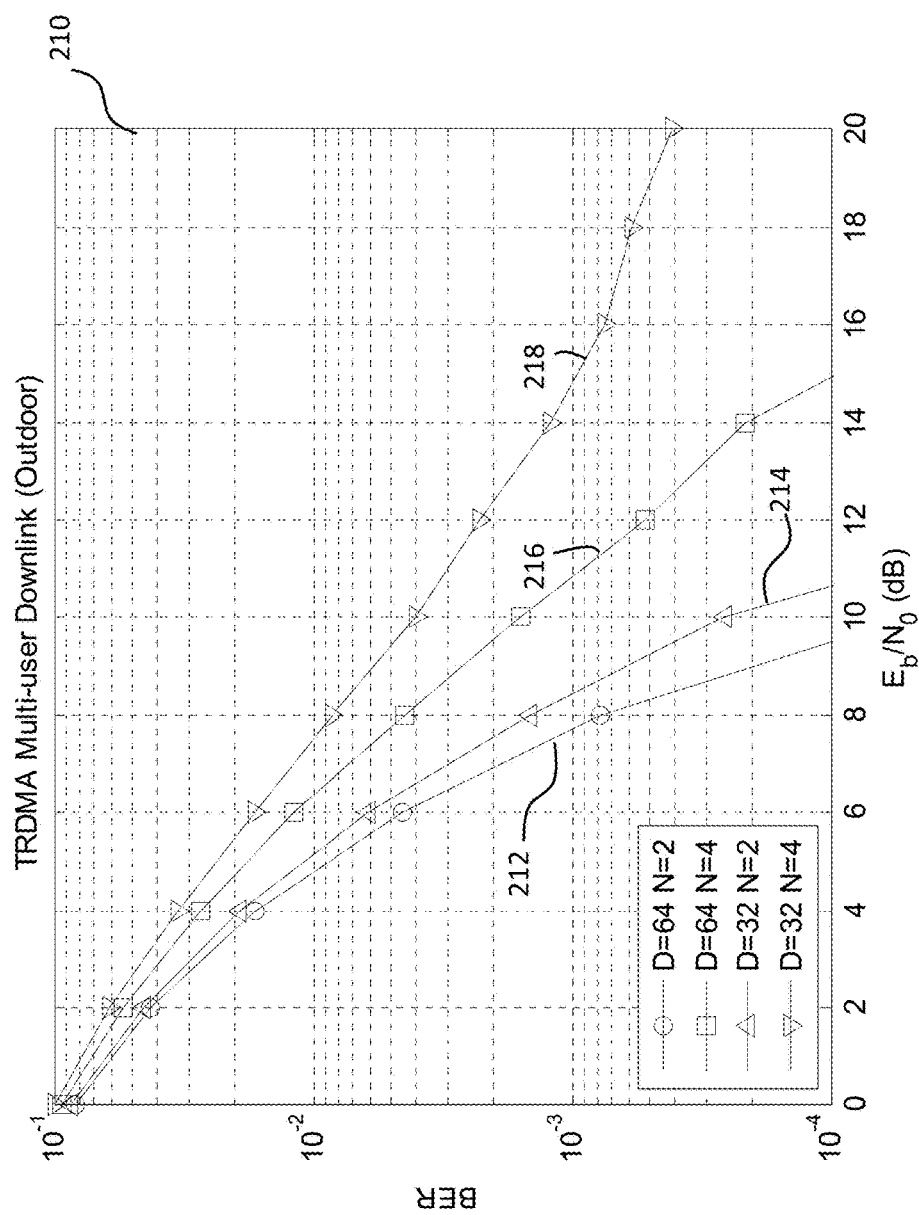
FIG. 8 is a graph showing the bit error rate (BER) performance of the time reversal system for downlink transmission in an outdoor environment.

Referring to FIG. 8, a graph 210 shows the bit error rate (BER) performance of the system 150 for downlink transmission in an outdoor environment. A curve 212 represents the bit error rate when the rate back-off factor D is equal to 64, and the number of users N is equal to 2. A curve 214 represents the bit error rate when the rate back-off factor D is equal to 32, and the number of users N is equal to 2. A curve 216 represents the bit error rate when the rate back-off factor D is equal to 64, and the number of users N is equal to 4. A curve 218 represents the bit error rate when the rate back-off factor D is equal to 32, and the number of users N is equal to 4.

Figure 9:
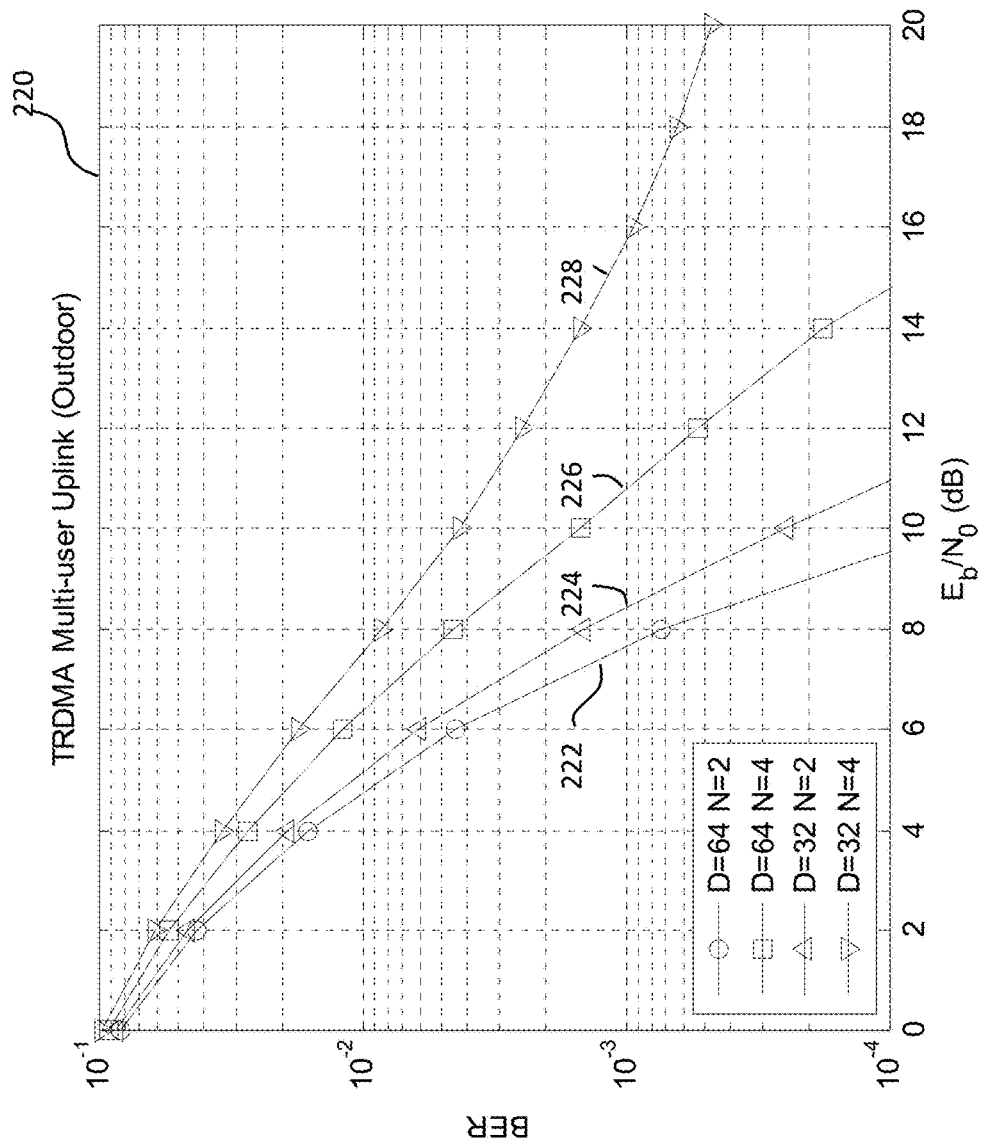
FIG. 9 is a graph showing the bit error rate performance of the time reversal system for uplink transmission in an outdoor environment.

Referring to FIG. 9, a graph 220 shows the bit error rate performance of the system 150 for uplink transmission in an outdoor environment. A curve 222 represents the bit error rate when the rate back-off factor D is equal to 64, and the number of users N is equal to 2. A curve 224 represents the bit error rate when the rate back-off factor D is equal to 32, and the number of users N is equal to 2. A curve 226 represents the bit error rate when the rate back-off factor D is equal to 64, and the number of users N is equal to 4. A curve 228 represents the bit error rate when the rate back-off factor D is equal to 32, and the number of users N is equal to 4.

Figure 10:
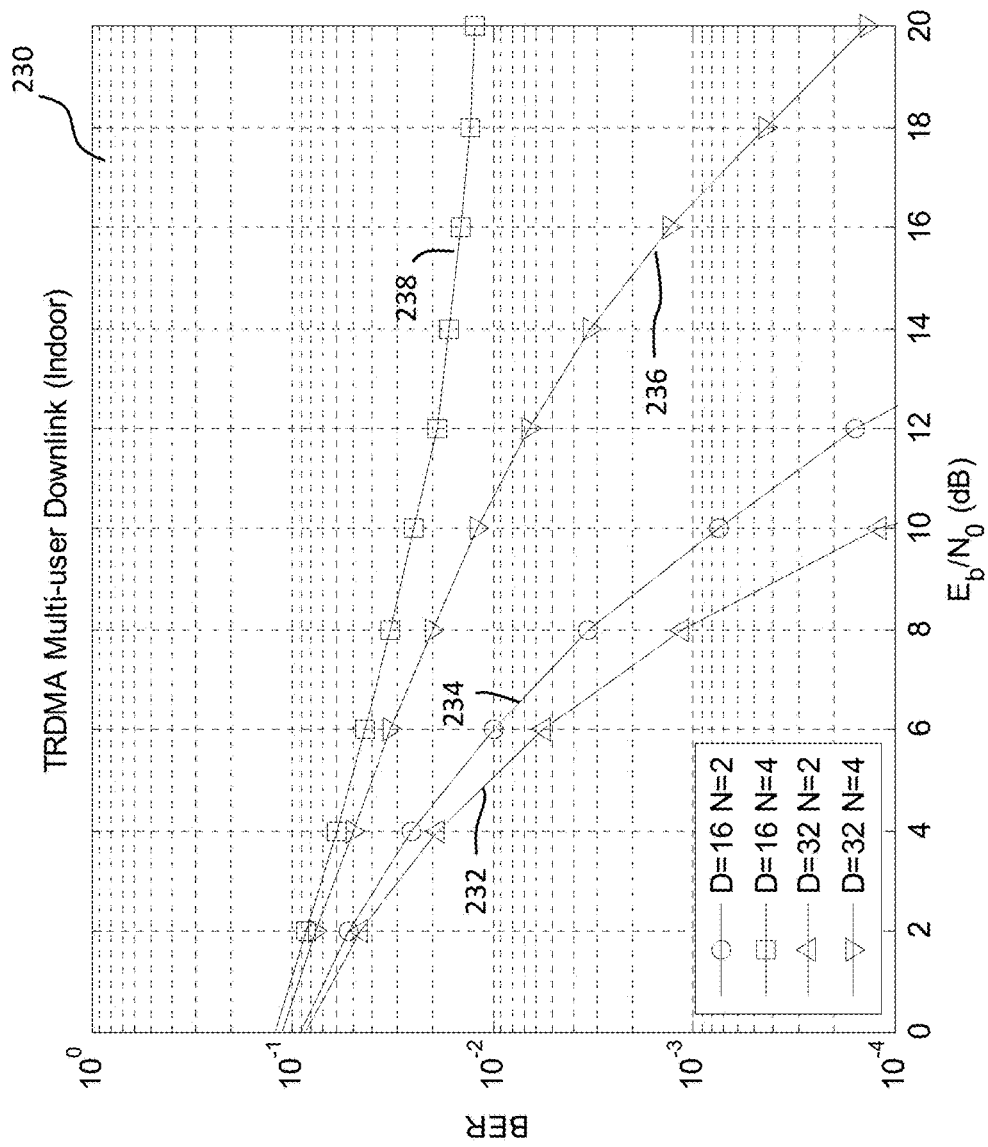
FIG. 10 is a graph showing the bit error rate performance of the time reversal system for downlink transmission in an indoor environment.

Referring to FIG. 10, a graph 230 shows the bit error rate performance of the system 150 for downlink transmission in an indoor environment. A curve 232 represents the bit error rate when the rate back-off factor D is equal to 32, and the number of users N is equal to 2. A curve 234 represents the bit error rate when the rate back-off factor D is equal to 16, and the number of users N is equal to 2. A curve 236 represents the bit error rate when the rate back-off factor D is equal to 32, and the number of users N is equal to 4. A curve 238 represents the bit error rate when the rate back-off factor D is equal to 16, and the number of users N is equal to 4.

Figure 11:
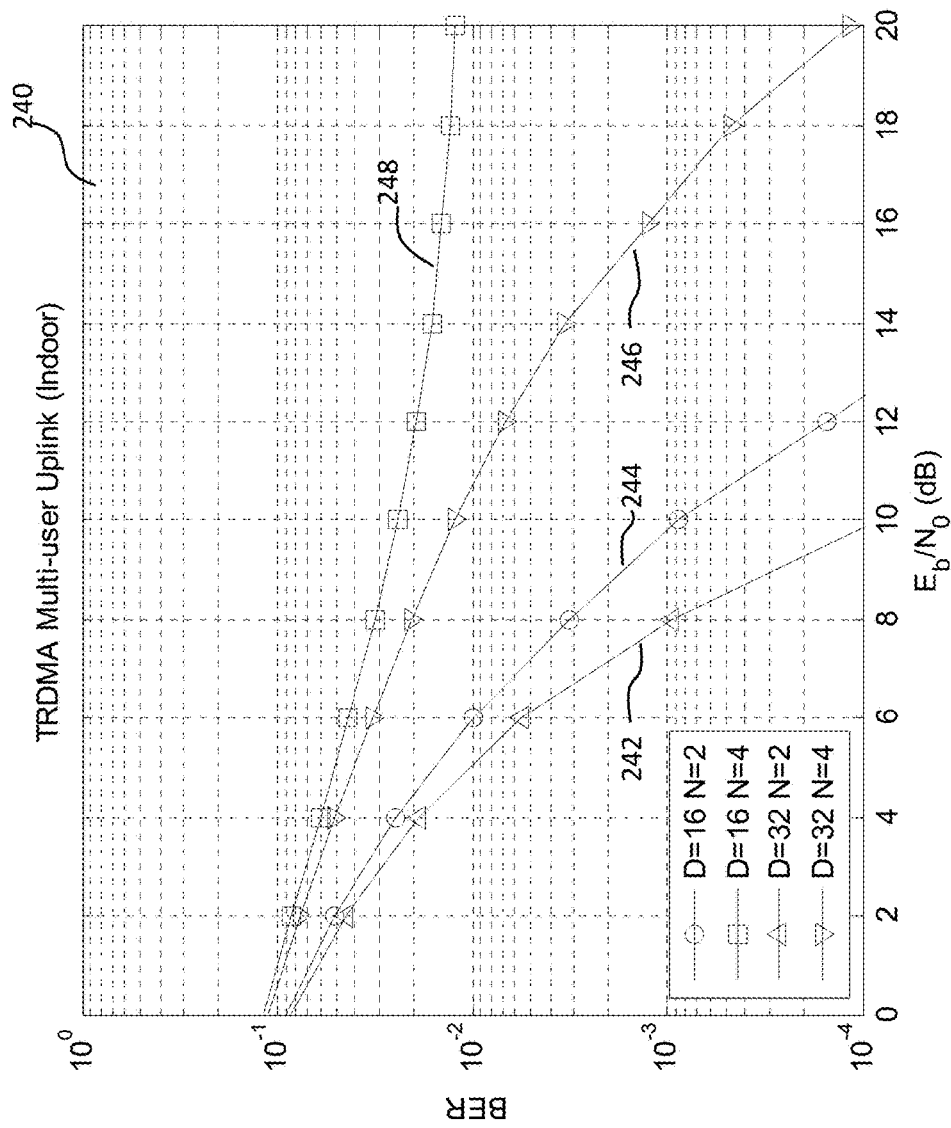
FIG. 11 is a graph showing the bit error rate performance of the time reversal system for uplink transmission in an indoor environment.

Referring to FIG. 11, a graph 240 shows the bit error rate performance of the system 150 for uplink transmission in an indoor environment. A curve 242 represents the bit error rate when the rate back-off factor D is equal to 32, and the number of users N is equal to 2. A curve 244 represents the bit error rate when the rate back-off factor D is equal to 16, and the number of users N is equal to 2. A curve 246 represents the bit error rate when the rate back-off factor D is equal to 32, and the number of users N is equal to 4. A curve 248 represents the bit error rate when the rate back-off factor D is equal to 16, and the number of users N is equal to 4.

Figure 12:
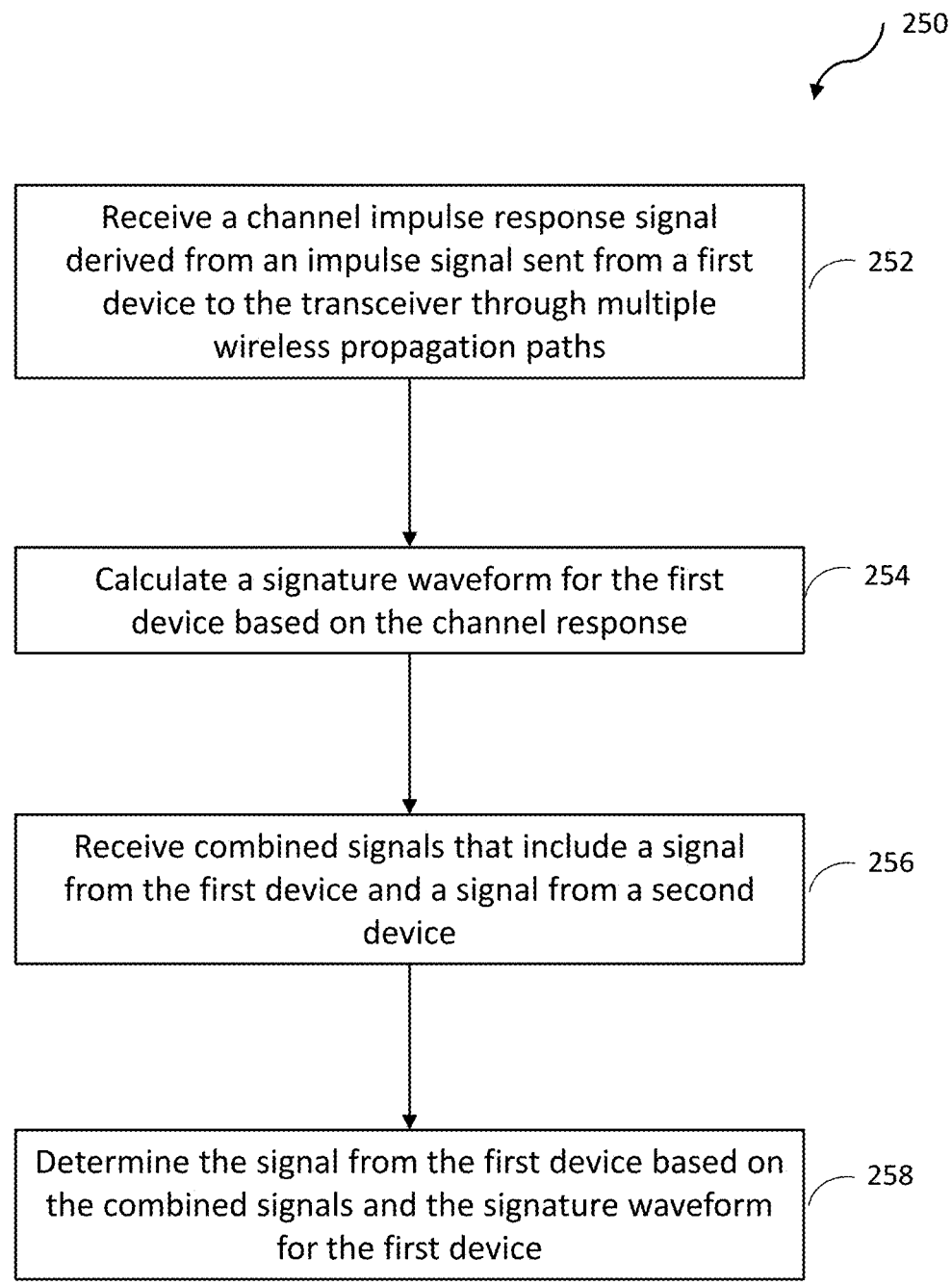
FIGS. 12-14 are flow diagrams of exemplary processes for asymmetric time-reversal wireless communication.

Referring to FIG. 12, a process 250 for asymmetric time-reversal wireless communication is provided. For example, the process 250 can be implemented using the base station 152 shown in FIGS. 4-7. The process 250 includes, at a transceiver, receiving a channel response signal derived from a probe signal sent from a first device to the transceiver through multiple wireless propagation paths (252). For example, the transceiver can be part of the base station 152.

The process 250 includes calculating a signature waveform for the first device based on the channel response (254). For example, the first device can be the first terminal device 154a.

The process 250 includes receiving combined signals that include a signal from the first device and a signal from a second device (256). For example, the second device can be the second terminal device 154b.

The process 250 includes determining the signal from the first device based on the combined signals and the signature waveform for the first device (258). For example, the base station 152 can receive the combined signals from the first and second terminal devices 154a and 154b and apply the signature waveform for the first terminal device 154a to the combined signals to determine the signal from the first terminal device 154a. For example, a convolution operation, or an operation equivalent to the convolution operation, can be performed between the combined signals and the signature waveform for the first device. For example, the signature waveform for the first device can be a time-reversed waveform of the channel response signal derived from the probe signal sent from the first device.

Figure 13:
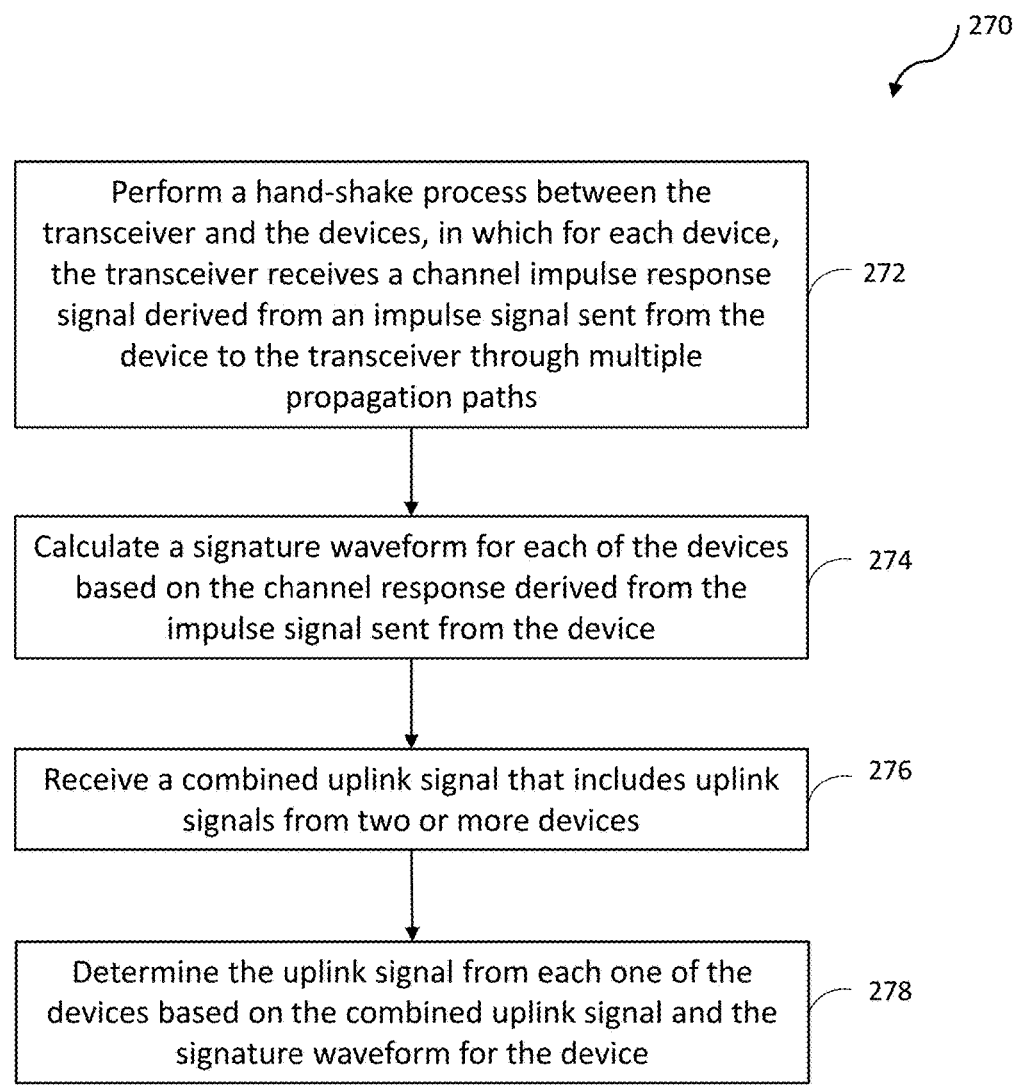

Referring to FIG. 13, a process 270 for communication between a transceiver and multiple devices using wireless multi-path signals is provided. For example, the transceiver can be the base station 152, and the multiple devices can be the terminal devices 154 in FIGS. 4-7.

The process 270 includes performing a hand-shake process between the transceiver and the devices, in which for each device, the transceiver receives a channel response signal derived from a probe signal sent from the device to the transceiver through multiple propagation paths (272). For example, after each device registers with the transceiver, a hand-shaking process can occur periodically in a round-robin manner among the registered devices to maintain an up-to-date record of the channel responses associated with the devices at the transceiver. During the hand-shaking process, at a given time, only one selected device performs radio frequency modulation to produce a radio frequency signal that propagates through the associated multi-path channel to the transceiver. The transceiver receives the transmitted radio frequency signal, performs radio frequency demodulation to recover the unique channel response (waveform) and records it. When the selected device is performing the hand-shaking process with the transceiver, the other devices remain silent.

The process 270 includes calculating a signature waveform for each of the devices based on the channel response derived from the probe signal sent from the device (274). For example, a signature waveform for a device associated with a channel response h(t) can be h*(T−t), which is a time-reversed waveform of the channel response, with T representing the delay spread of the multi-path channel. In discrete time domain, the channel response can be represented as h[k], and the corresponding signature waveform can be h*[L−k], in which L represents the delay spread of the multi-path channel.

The process 270 includes receiving a combined uplink signal that includes uplink signals from two or more devices (276), and determining the uplink signal from each one of the devices based on the combined uplink signal and the signature waveform for the device (278). For example, the base station 152 can receive a combined uplink signal that includes uplink signals from the first and second terminal devices 154a and 154b. The base station 152 can apply the signature waveform for the first terminal device 154a to the combined signals to determine the signal from the first terminal device 154a, and apply the signature waveform for the second terminal device 154b to the combined signals to determine the signal from the second terminal device 154b. For example, a convolution operation, or an operation equivalent to the convolution operation, can be performed between the combined signals and the signature waveform for the first or second device.

Figure 14:
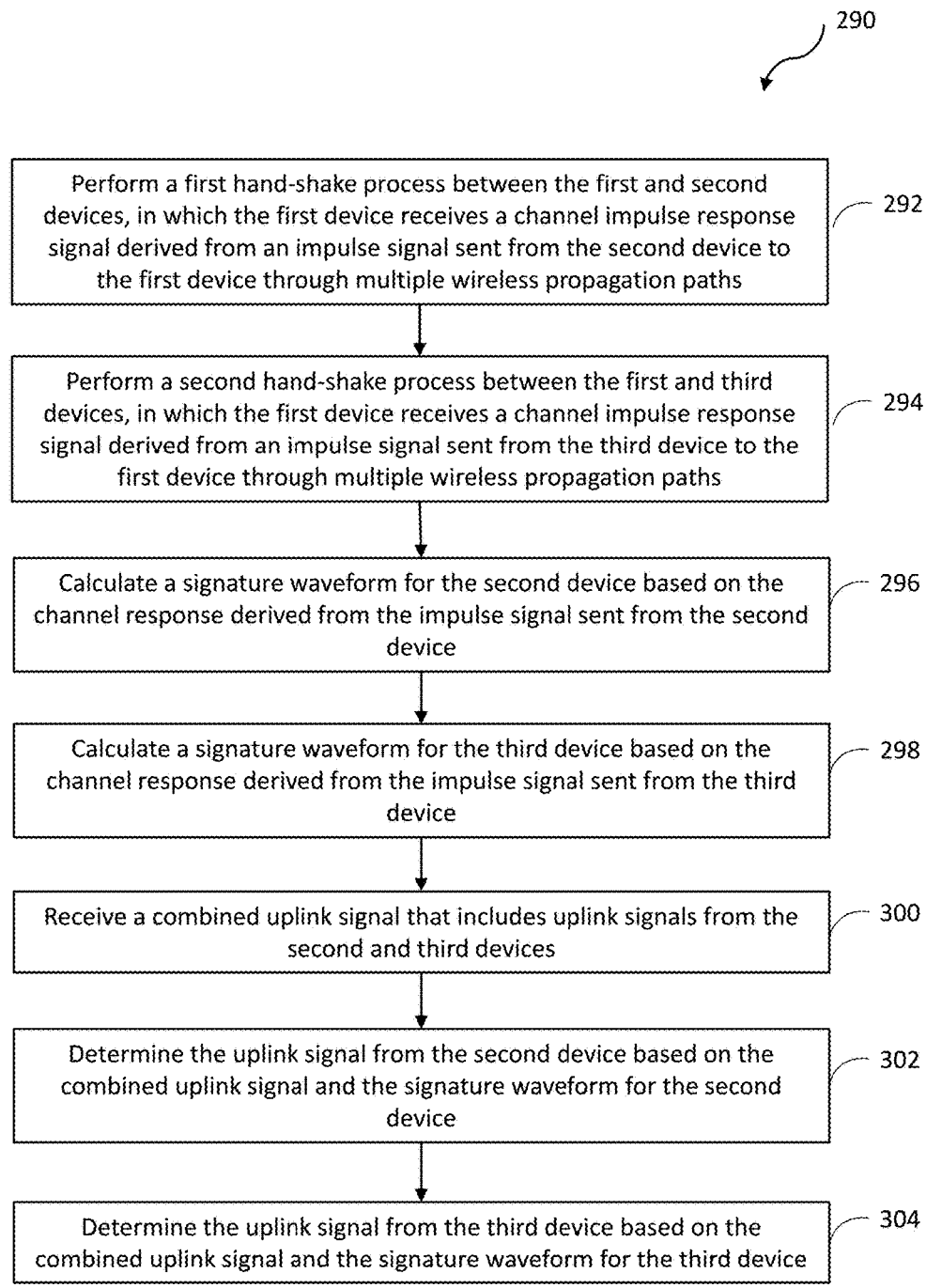

Referring to FIG. 14, a process 290 for asymmetric time-reversal communication between a plurality of devices using wireless multi-path signals is provided. For example, the devices can include the base station 152 and the terminal devices 154 of FIGS. 4-7.

The process 290 includes performing a first hand-shake process between the first and second devices, in which the first device receives a channel response signal derived from a probe signal sent from the second device to the first device through multiple wireless propagation paths (292). For example, the first device can be the base station 152, and the second device can be the first terminal device 154a.

The process 290 includes performing a second handshake process between the first and third devices, in which the first device receives a channel response signal derived from a probe signal sent from the third device to the first device through multiple wireless propagation paths (294). For example, the third device can be the second terminal device 154b.

The process 290 includes at the first device, calculating a signature waveform for the second device based on the channel response derived from the probe signal sent from the second device (296); and at the first device, calculating a signature waveform for the third device based on the channel response derived from the probe signal sent from the third device (298). For example, the signature waveform for the first or second terminal devices 154a or 154b can be a time-reversed waveform of the channel response signal derived from the probe signal sent from the first or second terminal devices 154a or 154b, respectively. A signature waveform for the first or second terminal devices associated with a channel response h(t) can be h*(T−t), which is a time-reversed waveform of the channel response, with T representing the delay spread of the multi-path channel. If h(t) is a complex value, h*(T−t) is the time reverse and conjugation of the channel response h(t). In discrete time domain, the channel response can be represented as h[k], and the corresponding signature waveform can be h*[L−k], in which L represents the delay spread of the multi-path channel.

The process 290 includes at the first device, receiving a combined uplink signal that includes uplink signals from the second and third devices (300). For example, the base station 152 can receive a combined uplink signal that includes uplink signals from the first and second terminal devices 154a, 154b.

The process 290 includes at the first device, determining the uplink signal from the second device based on the combined uplink signal and the signature waveform for the second device (302); and at the first device, determining the uplink signal from the third device based on the combined uplink signal and the signature waveform for the third device (304). For example, the base station 152 can apply the signature waveform for the first terminal device 154a to the combined signals to determine the signal from the first terminal device 154a, and apply the signature waveform for the second terminal device 154b to the combined signals to determine the signal from the second terminal device 154b. For example, a convolution operation, or an operation equivalent to the convolution operation, can be performed between the combined signals and the signature waveform for the first or second terminal device 154a or 154b.

In this disclosure, an asymmetric system architecture for the time reversal wireless communication system 150 has been described. The system 100 can have one or more of the following features and advantages:

The system 150 uses a single-carrier wireless broadband communication technology using the time reversal structure and other modified waveforms, which effectively suppress the inter-symbol interference.

The system 150 leverages the time-reversal division multiple access concept to explore the spatial degrees of freedom, and thus enables multiple simultaneous transmissions on the same frequency band.

The system architecture described above can accommodate all types of waveform design (as a natural generalization of the time-reversed channel response), and arbitrary channel coding scheme (including the uncoded scheme as a special case).

When the time-reversal waveform is used as the signature waveform, the downlink scheme described above can form the spatial focusing effect of time reversal, focusing the signal power only at the locations of the intended terminal devices. Such a physical spatial focusing effect reduces the co-channel interference and electromagnetic pollution to the environment, and enhances the privacy and security of the transmitted message.

The asymmetric complexity-distribution between the base station (e.g., 152) (which has the most complexity) and the terminal devices (e.g., 154) (which can be of low complexity) makes the terminal devices affordable, which is a desirable feature for systems having a large number of terminal devices that are limited by size, power, and/or computational capability.

The architecture design described above does not require channel equalization at the terminal devices to enable two-way communication.

In some implementations, the base station 152 can be part of a mobile or stationary device. For example, the base station 152 can be implemented as part of a sensor module, a controller, a mobile phone, a laptop computer, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above.

The transmitter can include one or more processors and one or more computer-readable mediums (e.g., RAM, ROM, SDRAM, hard disk, optical disk, and flash memory). The one or more processors can implement functions of the waveform embedding 176 (FIG. 6) and information extraction 200 (FIG. 7). The waveform embedding 176 and information extraction 200 can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the system 150 can combine time division with frequency division to allow a base station to communicate with a first group of terminal devices at a first frequency and a second group of terminal devices at a second frequency. In this example, the base station can perform a hand-shaking process with two or more terminal devices at different frequencies. The base station 152 and terminal devices 154 can include more components that are not shown in the figures. For example, standard components such as analog-to-digital converters, digital-to-analog converters, and power amplifiers have been omitted from the figures.

Accordingly, other embodiments are within the scope of the following claims.

What is claimed is:

1. A method comprising:
   at a transceiver, receiving a channel response signal derived from a probe signal sent from a first device to the transceiver through multiple wireless propagation paths;
   at the transceiver, calculating a signature waveform for the first device based on the channel response;
   at the transceiver, receiving combined signals that include a first signal from the first device and a second signal from a second device, wherein
      the first device comprises a first antenna, a first data source, and a first encoder,
      the second device comprises a second antenna, a second data source, and a second encoder,
      the first signal is derived from first data from the first data source and encoded by the first encoder, the first signal is transmitted by the first device at a first frequency band, and the second signal is derived from second data from the second data source and encoded by the second encoder, the second signal is transmitted by the second device at a second frequency band, in which a first particular frequency is common to both the first and second frequency bands and a second particular frequency of the first frequency band is not in the second frequency band; and at the transceiver, determining the first signal from the first device based on the combined signals and the signature waveform for the first device.

2. The method of claim 1 in which determining the signal from the first device comprises, at the transceiver, performing a convolution operation, or an operation equivalent to the convolution operation, between the combined signals and the signature waveform for the first device.

3. The method of claim 1 in which determining the signal from the first device comprises filtering the combined signals using the signature waveform as a filtering parameter.

4. The method of claim 1 in which the signature waveform for the first device is a time-reversed waveform of the channel response signal derived from the probe signal sent from the first device.

5. The method of claim 4 in which the channel response signal is represented as h(t) and the signature waveform for the first device is represented as h*(T−t), t representing time, and representing a delay spread of the multiple propagation paths.

6. The method of claim 4 in which the channel response signal is represented as h[k] and the signature waveform for the first device is represented as h*[L−k], k being an integer, and L representing a delay spread of the multiple propagation paths.

7. The method of claim 1, comprising transmitting, from the transceiver to the first receiver and a second receiver, a combined downlink signal derived from a combination of a first downlink waveform and a second downlink waveform, the first downlink waveform including data intended for the first device, the second downlink waveform including data intended for the second device.

8. The method of claim 7, comprising generating the first downlink waveform based on the data intended for the first device and the signature waveform for the first device.

9. The method of claim 8 in which generating the first downlink waveform comprises performing a convolution of the data intended for the first device and the signature waveform for the first device.

10. The method of claim 7 in which the combined downlink signal is configured to enable each of the first device and the second device to receive multipath signals that can be used determine a data signal intended for the device, the first and second devices receiving the downlink signal through different propagation paths and determining different data signals.

11. The method of claim 1 in which the transceiver is part of a base station.

12. The method of claim 1 in which receiving combined signals comprises receiving combined signals that include signals from three or more devices communicating with the transceiver, each of the devices being associated with a corresponding signature waveform.

13. The method of claim 1 in which the first device does not calculate the signature waveform.

14. The method of claim 1 in which the first device does not perform any signal processing that uses the signature waveform.

15. A method of communication between a transceiver and multiple devices using wireless multi-path signals, the method comprising:

performing a hand-shake process between the transceiver and the devices, in which for each device, the transceiver receives a channel response signal derived from a probe signal sent from the device to the transceiver through multiple propagation paths;

at the transceiver, calculating a signature waveform for each of the devices based on the channel response derived from the probe signal sent from the device;

at the transceiver, receiving a combined uplink signal that includes uplink signals from two or more devices, wherein each of the devices comprises an antenna, a data source, and an encoder, and each of the uplink signals is derived from data from a respective data source and encoded by a respective encoder, in which at least two uplink signals are transmitted by respective devices at two frequency bands in which a first particular frequency is common to the two frequency bands and a second particular frequency of one of the two frequency bands is not in the other of the two frequency bands; and at the transceiver, determining the uplink signal from each one of the devices based on the combined uplink signal and the signature waveform for the device.

16. The method of claim 15 in which the transceiver is part of a base station.

17. The method of claim 15 in which the devices do not calculate any signature waveform.

18. The method of claim 15 in which the devices do not perform any signal processing that uses the signature waveform.

19. A method of asymmetric time-reversal communication between a plurality of devices using wireless multi-path signals, the method comprising:

performing a first hand-shake process between the first and second devices, in which the first device receives a channel response signal derived from a probe signal sent from the second device to the first device through multiple wireless propagation paths;

performing a second hand-shake process between the first and third devices, in which the first device receives a channel response signal derived from a probe signal sent from the third device to the first device through multiple wireless propagation paths;

at the first device, calculating a signature waveform for the second device based on the channel response derived from the probe signal sent from the second device;

at the first device, calculating a signature waveform for the third device based on the channel response derived from the probe signal sent from the third device;

at the first device, receiving a combined uplink signal that includes a second uplink signal from the second device and a third uplink signal from the third device, wherein
the second device comprises a second antenna, a second data source, and a second encoder,
the third device comprises a third antenna, a third data source, and a third encoder,
the second uplink signal is derived from second data from the second data source and encoded by the second encoder, the second uplink signal is transmitted by the second device at a second frequency band, and
the third uplink signal is derived from third data from the third data source and encoded by the third encoder, the third uplink signal is transmitted by the third device at a third frequency band, in which a first particular frequency is common to the second frequency band and the third frequency band, and a second particular frequency of the second frequency band is not in the third frequency band;

at the first device, determining the second uplink signal from the second device based on the combined uplink signal and the signature waveform for the second device; and at the first device, determining the third uplink signal from the third device based on the combined uplink signal and the signature waveform for the third device.

20. The method of claim 19 in which the second and third devices do not calculate any signature waveform.

21. The method of claim 19, comprising transmitting, from the first device to the second and third devices, a combined downlink signal derived from a combination of a second downlink waveform and a third downlink waveform, the second downlink waveform including data intended for the second device, the third downlink waveform including data intended for the third device.

22. The method of claim 21 in which the second downlink waveform is embedded with the signature waveform corresponding to the second device.

23. The method of claim 22, comprising at the second device, receiving a signal intended for the second device without performing any signal processing that uses the signature waveform corresponding to the second device.

24. The method of claim 21, comprising at the first device, generating the second downlink waveform based on the data intended for the second device and the signature waveform for the second device.

25. The method of claim 24 in which generating the second downlink waveform comprises performing a convolution of the data intended for the second device and the signature waveform for the second device.

26. The method of claim 21 in which the combined downlink signal is configured to enable each of the second and third devices to receive multipath signals that can be used determine a data signal intended for the device, the second and third devices receiving the combined downlink signal through different propagation paths and determining different data signals.

27. The method of claim 19 in which determining the uplink signal from the second device comprises performing a convolution operation, or an operation equivalent to the convolution operation, between the combined uplink signal and the signature waveform for the second device.

28. The method of claim 19 in which determining the uplink signal from the second device comprises filtering the combined uplink signal using the signature waveform corresponding to the second device as a filtering parameter.

29. The method of claim 19 in which the signature waveform for the second device is a time-reversed waveform of the channel response signal derived from the probe signal sent from the second device.

30. The method of claim 29 in which the channel response signal derived from the probe signal sent from the second device is represented as $h(t)$ and the signature waveform for the second device is represented as $h^*(T-t)$, t representing time, and representing a delay spread of the multiple propagation paths.

31. The method of claim 29 in which the channel response signal derived from the probe signal sent from the second device is represented as $h[k]$ and the signature waveform for the second device is represented as $h^*[L-k]$, k being an integer, and L representing a delay spread of the multiple propagation paths.

32. The method of claim 19 in which the first device comprises a base station.

33. The method of claim 19 in which receiving a combined uplink signal comprises receiving a combined uplink signal that includes signals from the second and third devices, and one or more additional devices communicating wirelessly with the first device, each of the devices being associated with a corresponding signature waveform.

34. The method of claim 1 in which the first frequency band is the same as the second frequency band.

35. The method of claim 15 in which the at least two uplink signals are transmitted by respectively devices at a same frequency band.

36. The method of claim 19 in which the second frequency band is the same as the third frequency band.

* * * * *

UNITED STATES PATENT AND TRADEMARK OFFICE
CERTIFICATE OF CORRECTION

PATENT NO. : 9,882,675 B2
APPLICATION NO. : 13/969271
DATED : January 30, 2018
INVENTOR(S) : Feng Han et al.

Page 1 of 1

It is certified that error appears in the above-identified patent and that said Letters Patent is hereby corrected as shown below:

In Claim 5
Column 17, Line 28, delete "and representing" and insert -- and T representing --.

In Claim 10
Column 17, Line 52, delete "used determine" and insert -- used to determine --.

In Claim 26
Column 19, Line 41, delete "used determine" and insert -- used to determine --.

In Claim 30
Column 20, Line 19, delete "and representing" and insert -- and T representing --.

Signed and Sealed this
Fifth Day of June, 2018

Andrei Iancu
*Director of the United States Patent and Trademark Office*